United States Patent
Sekiguchi et al.

(10) Patent No.: US 10,334,251 B2
(45) Date of Patent: Jun. 25, 2019

(54) IMAGE CODING DEVICE, IMAGE DECODING DEVICE, IMAGE CODING METHOD, AND IMAGE DECODING METHOD

(71) Applicant: Mitsubishi Electric Corporation, Tokyo (JP)

(72) Inventors: Shunichi Sekiguchi, Tokyo (JP); Kazuo Sugimoto, Tokyo (JP); Hiroharu Sakate, Tokyo (JP); Tokumichi Murakami, Tokyo (JP); Akira Minezawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/868,253

(22) Filed: Jan. 11, 2018

(65) Prior Publication Data

US 2018/0139452 A1    May 17, 2018

Related U.S. Application Data

(62) Division of application No. 15/479,584, filed on Apr. 5, 2017, now Pat. No. 9,906,795, which is a division
(Continued)

(30) Foreign Application Priority Data

Jun. 30, 2011  (JP) ................. 2011-145612

(51) Int. Cl.
*H04N 19/154* (2014.01)
*H04N 19/159* (2014.01)
(Continued)

(52) U.S. Cl.
CPC ......... *H04N 19/154* (2014.11); *H04N 19/117* (2014.11); *H04N 19/14* (2014.11);
(Continued)

(58) Field of Classification Search
CPC .......... H04N 19/00763; H04N 19/117; H04N 19/14; H04N 19/159; H04N 19/176;
(Continued)

(56) References Cited

U.S. PATENT DOCUMENTS 5,787,388 A    7/1998  Hayata
6,064,776 A *  5/2000  Kikuchi ................. H04N 19/80
                                              375/240.29
(Continued)

FOREIGN PATENT DOCUMENTS

EP    2 323 398 A2    5/2011
EP      2339852 A1    6/2011
(Continued)

OTHER PUBLICATIONS

Series H: Audiovisual and Multimedia Systems Infrastructure of audiovisual services—Coding of moving video, "Advanced video coding for generic audiovisual services", ITU-T H.264, Mar. 2010, 674 pages.
(Continued)

*Primary Examiner* — Mekonen T Bekele
(74) *Attorney, Agent, or Firm* — Birch, Stewart, Kolasch & Birch, LLP.

(57) ABSTRACT

When removing a block distortion occurring in a local decoded image, a loop filtering part 11 of an image coding device carries out a filtering process on each of signal components (a luminance signal component and color difference signal components) after setting the intensity of a filter for removing the block distortion for each of the signal components according to a coding mode (an intra coding mode or an inter coding mode) selected by a coding controlling part 1.

5 Claims, 14 Drawing Sheets

Related U.S. Application Data of application No. 14/707,940, filed on May 8, 2015, now Pat. No. 9,654,773, which is a division of application No. 14/110,366, filed as application No. PCT/JP2012/003680 on Jun. 5, 2012, now Pat. No. 9,210,426.

(51) Int. Cl.

| | | |
|---|---|---|
| *H04N 19/176* | (2014.01) | |
| *H04N 19/61* | (2014.01) | |
| *H04N 19/117* | (2014.01) | |
| *H04N 19/14* | (2014.01) | |
| *H04N 19/186* | (2014.01) | |
| *H04N 19/86* | (2014.01) | |
| *H04N 19/593* | (2014.01) | |
| *H04N 19/82* | (2014.01) | |
| *H04N 19/46* | (2014.01) | |

(52) U.S. Cl.
CPC ......... *H04N 19/159* (2014.11); *H04N 19/176* (2014.11); *H04N 19/186* (2014.11); *H04N 19/593* (2014.11); *H04N 19/61* (2014.11); *H04N 19/82* (2014.11); *H04N 19/865* (2014.11); *H04N 19/46* (2014.11)

(58) Field of Classification Search
CPC .... H04N 19/186; H04N 19/593; H04N 19/61; H04N 19/865; H04N 19/46
See application file for complete search history.

(56) References Cited

U.S. PATENT DOCUMENTS

| | | | |
|---|---|---|---|
| 7,126,989 B2 * | 10/2006 | Hagai | H04N 19/159 375/240.13 |
| 8,040,951 B2 * | 10/2011 | Kitada | H04N 19/176 375/240.12 |
| 8,396,127 B1 | 3/2013 | Bultje et al. | |
| 8,488,889 B2 * | 7/2013 | Moriya | H04N 19/56 382/232 |
| 8,576,906 B2 | 11/2013 | Andersson et al. | |
| 8,625,668 B2 | 1/2014 | Fujisawa et al. | |
| 8,630,347 B2 | 1/2014 | Fujisawa et al. | |
| 9,210,426 B2 | 12/2015 | Sekiguchi et al. | |
| 9,344,729 B1 * | 5/2016 | Grange | H04N 19/117 |
| 9,838,690 B1 * | 12/2017 | Grange | H04N 19/117 |
| 10,075,725 B2 * | 9/2018 | Minezawa | H04N 19/503 |
| 2002/0146072 A1 | 10/2002 | Sun et al. | |
| 2003/0206587 A1 | 11/2003 | Gomila | |
| 2004/0081366 A1 | 4/2004 | Monobe et al. | |
| 2004/0179620 A1 * | 9/2004 | Foo | H04N 19/513 375/240.27 |
| 2004/0184549 A1 | 9/2004 | Webb | |
| 2005/0053143 A1 | 3/2005 | Holcomb et al. | |
| 2006/0067406 A1 | 3/2006 | Kitada et al. | |
| 2006/0104538 A1 | 5/2006 | Izumi | |
| 2007/0009044 A1 | 1/2007 | Tourapis et al. | |
| 2007/0025445 A1 | 2/2007 | Hong | |
| 2007/0025448 A1 | 2/2007 | Cha et al. | |
| 2007/0160140 A1 | 7/2007 | Fujisawa et al. | |
| 2007/0201555 A1 * | 8/2007 | Kikuchi | H04N 21/25808 375/240.13 |
| 2007/0217508 A1 | 9/2007 | Shimada et al. | |
| 2007/0223585 A1 * | 9/2007 | Fujisawa | H04N 19/176 375/240.13 |
| 2008/0137753 A1 * | 6/2008 | He | H04N 19/139 375/240.24 |
| 2008/0170615 A1 | 7/2008 | Sekiguchi et al. | |
| 2008/0260025 A1 * | 10/2008 | Wada | H04N 19/176 375/240.03 |
| 2008/0317377 A1 | 12/2008 | Saigo et al. | |
| 2009/0003441 A1 | 1/2009 | Sekiguchi et al. | |
| 2009/0028427 A1 | 1/2009 | Yamada et al. | |
| 2009/0257664 A1 * | 10/2009 | Kao | H04N 19/159 382/232 |
| 2010/0135389 A1 * | 6/2010 | Tanizawa | H04N 19/159 375/240.12 |
| 2010/0183068 A1 | 7/2010 | Pandit et al. | |
| 2012/0141037 A1 | 6/2012 | Sato | |
| 2012/0201311 A1 * | 8/2012 | Sole | H04N 19/176 375/240.29 |
| 2013/0028322 A1 | 1/2013 | Fujibayashi et al. | |
| 2014/0044369 A1 | 2/2014 | Sekiguchi et al. | |
| 2014/0168362 A1 * | 6/2014 | Hannuksela | H04N 13/161 348/43 |
| 2015/0365666 A1 | 12/2015 | Dong et al. | |
| 2016/0249059 A1 * | 8/2016 | Park | H04N 19/30 |
| 2018/0091812 A1 * | 3/2018 | Guo | H04N 19/117 |

FOREIGN PATENT DOCUMENTS

| | | |
|---|---|---|
| JP | 2002-330436 A | 11/2002 |
| JP | 2004-096719 A | 3/2004 |
| JP | 2005-524346 A | 8/2005 |
| JP | 2009-4920 A | 1/2009 |
| JP | 2010-516097 A | 5/2010 |
| JP | 2011-49740 A | 3/2011 |
| KR | 10-2010-0036284 A | 4/2010 |
| KR | 10-2010-0103822 A | 9/2010 |
| KR | 10-2015-0009984 A | 1/2015 |
| WO | WO 2005/122588 A1 | 12/2005 |
| WO | WO 2009/091521 A2 | 7/2009 |
| WO | WO 2011/061880 A1 | 5/2011 |

OTHER PUBLICATIONS

Series H: Audiovisual and Multimedia Systems, Infrastructure of audiovisual services—Coding of moving video, Information technology—Generic coding of moving pictures and associated audio information: Video, ITU-T H.262, Feb. 2000, 220 pages.

Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, Doc. JCTVC-E603, 5th Meeting, Geneva, Switzerland, Mar. 16-23, 2011, 13 pages.

* cited by examiner

FIG.13

| | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Q | 0 | 0 | 0 | 0 | 0 | 0 | 0 | 0 | 0 | 0 | 0 | 0 | 0 | 0 | 0 | 0 | 0 | 7 | 18 |
| β | 0 | 0 | 0 | 0 | 0 | 0 | 0 | 0 | 0 | 0 | 0 | 0 | 0 | 0 | 0 | 0 | 6 | 7 | 8 |
| Tc | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| Tc | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | 54 | 55 | |
| β | 38 | 40 | 42 | 44 | 46 | 48 | 50 | 52 | 54 | 56 | 58 | 60 | 62 | 64 | 64 | 64 | 64 | 64 | |
| Tc | 5 | 5 | 6 | 6 | 7 | 8 | 9 | 9 | 10 | 10 | 11 | 11 | 12 | 12 | 13 | 13 | 14 | 14 | |

IMAGE CODING DEVICE, IMAGE DECODING DEVICE, IMAGE CODING METHOD, AND IMAGE DECODING METHOD

CROSS-REFERENCE TO RELATED APPLICATIONS

This application is a Divisional of co-pending application Ser. No. 15/479,584, filed on Apr. 5, 2017, which is a Divisional of application Ser. No. 14/707,940, filed May 8, 2015 (now U.S. Pat. No. 9,654,773 issued on May 16, 2017), which is a Divisional of application Ser. No. 14/110,366, filed on Oct. 7, 2013 (now U.S. Pat. No. 9,210,426 issued Dec. 8, 2015), which was filed as PCT International Application No. PCT/JP2012/003680 on Jun. 5, 2012, which claims the benefit under 35 U.S.C. § 119(a) to Patent Application No. 2011-145612, filed in Japan on Jun. 30, 2011, all of which are hereby expressly incorporated by reference into the present application.

FIELD OF THE INVENTION

The present invention relates to an image coding device for and an image coding method of compression-coding an image and transmitting this image, and an image decoding device for and an image decoding method of decoding coded data transmitted from an image coding device to acquire an image.

BACKGROUND OF THE INVENTION

Conventionally, in accordance with an international standard video coding method, such as MPEG or ITU-T H.26x, an inputted video frame is divided into macroblocks each of which consists of a 16×16-pixel block, a motion-compensated prediction is carried out on each macroblock, and, after that, orthogonal transformation and quantization are carried out on a prediction error signal in units of a block in order to compress the information about the inputted video frame. A problem with such an international standard video coding method is, however, that as the compression ratio becomes high, the compression efficiency is reduced due to reduction in the quality of a prediction reference image which is used when carrying out the motion-compensated prediction. To solve this problem, in accordance with an MPEG-4 AVC/H.264 coding method (refer to nonpatent reference 1), a block distortion occurring in a prediction reference image through quantization of orthogonal transformation coefficients is removed by carrying out an in-loop blocking filtering process.

FIG. 16 is a block diagram showing an image coding device disclosed by nonpatent reference 1. In this image coding device, when receiving an image signal which is a target to be coded, a block dividing part 101 divides the image signal into image signals about macroblocks, and outputs the image signal about each of the macroblocks as a divided image signal to a predicting part 102. When receiving the divided image signal from the block dividing part 101, the predicting part 102 carries out an intra-frame or inter-frame prediction on an image signal of each color component in each of the macroblocks to calculate a prediction difference signal.

Particularly, when carrying out an inter-frame motion-compensated prediction on the image signal of each color component, the predicting part searches through each macroblock itself or each of subblocks into which each macroblock is divided more finely for a motion vector. The predicting part then carries out a motion-compensated prediction on a reference image signal stored in a memory 107 by using the motion vector to generate a motion-compensated prediction image, and calculates a prediction difference signal by acquiring the difference between a prediction signal showing the motion-compensated prediction image and the divided image signal. The predicting part 102 also outputs parameters for prediction signal generation which the predicting part determines when acquiring the prediction signal to a variable length coding part 108. For example, the parameters for prediction signal generation includes information such as a motion vector showing an inter-frame motion amount.

When receiving the prediction difference signal from the predicting part 102, a compressing part 103 removes a signal correlation from the prediction difference signal by carrying out a DCT (discrete cosine transform) process on the prediction difference signal, and, after that, acquires compressed data by quantizing the prediction difference signal from which the signal correlation is removed. When receiving the compressed data from the compressing part 103, a local decoding part 104 inverse-quantizes the compressed data and carries out an inverse DCT process on the compressed data inverse-quantized thereby, and calculates a prediction difference signal corresponding to the prediction difference signal outputted from the predicting part 102.

When receiving the prediction difference signal from the local decoding part 104, an adder 105 adds the prediction difference signal and the prediction signal outputted from the predicting part 102 to generate a local decoded image. A loop filter 106 removes a block distortion piggybacked onto a local decoded image signal showing the local decoded image generated by the adder 105, and stores the local decoded image signal from which the distortion is removed as a reference image signal in the memory 107.

When receiving the compressed data from the compressing part 103, the variable length coding part 108 entropy-encodes the compressed data and outputs a bitstream which is the coded result. When outputting the bitstream, the variable length coding part 108 multiplexes the parameters for prediction signal generation outputted from the predicting part 102 into the bitstream and outputs this bitstream.

According to a method disclosed by nonpatent reference 1, the loop filter 106 determines a smoothing intensity (filter intensity) for each neighboring pixel at a block boundary of DCT on the basis of information including the roughness of the quantization, the coding mode, the degree of variation in the motion vector, etc., and carries out a filtering process on the local decoded image so as to provide a reduction in a distortion (block distortion) occurring at a block boundary. As a result, the quality of the reference image signal can be improved, and the efficiency of the motion-compensated prediction in subsequent coding can be improved.

RELATED ART DOCUMENT

Nonpatent Reference

[Nonpatent Reference 1]
Nonpatent reference: MPEG-4 AVC (ISO/IEC 14496-10)/H.ITU-T 264 standards

SUMMARY OF THE INVENTION

Problems to be Solved by the Invention

Because the conventional image coding device is constructed as above, when the loop filter 106 removes a block distortion occurring in a block, the intensity of the filter for the luminance signal component of the block is determined on the basis of the coding mode, etc., while the intensity of the filter for the luminance signal component is also used as the intensity of the filter for each of the color difference signal components of the block. Therefore, a problem is that the intensity of the filter for each of the color difference signal components is not necessarily appropriate and the improvement of the image quality is restricted.

The present invention is made in order to solve the above-mentioned problem, and it is therefore an object of the present invention to provide an image coding device and an image coding method capable of improving the accuracy of block distortion removal, thereby improving the quality of a coded image. It is another object of the present invention to provide an image decoding device and an image decoding method capable of improving the accuracy of block distortion removal, thereby improving the quality of a decoded image.

Means for Solving the Problem

In accordance with the present invention, there is provided an image coding device including: a block dividing unit for dividing an inputted image into blocks each of which is a unit for coding process; a coding mode determining unit for determining a coding mode for each of the blocks into which the inputted image is divided by the block dividing unit; a prediction image generating unit for carrying out a prediction process on each of the blocks into which the inputted image is divided by the block dividing unit to generate a prediction image while referring to a local decoded image of an already-coded block according to the coding mode determined by the coding mode determining unit; a difference image generating unit for generating a difference image between each of the blocks into which the inputted image is divided by the block dividing unit, and the prediction image generated by the prediction image generating unit; an image compression unit for compressing the difference image generated by the difference image generating unit, and outputting compressed data of the difference image; a local decoded image generating unit for decompressing the difference image compressed by the image compression unit, and adding the difference image decompressed thereby and the prediction image generated by the prediction image generating unit to generate a local decoded image; a distortion removing unit for carrying out a filtering process on the local decoded image generated by the local decoded image generating unit to remove a block distortion occurring in the local decoded image; and a coding unit for coding the compressed data outputted from the image compression unit and the coding mode determined by the coding mode determining unit to generate a bitstream into which coded data of the compressed data and coded data of the coding mode are multiplexed, in which when removing a block distortion occurring in the local decoded image, the distortion removing unit sets an intensity of a filter for removing the block distortion for each signal component according to the coding mode determined by the coding mode determining unit.

Advantages of the Invention

Because the image coding device in accordance with the present invention is constructed in such a way that the image coding device includes: the block dividing unit for dividing an inputted image into blocks each of which is a unit for coding process; the coding mode determining unit for determining a coding mode for each of the blocks into which the inputted image is divided by the block dividing unit; the prediction image generating unit for carrying out a prediction process on each of the blocks into which the inputted image is divided by the block dividing unit to generate a prediction image while referring to a local decoded image of an already-coded block according to the coding mode determined by the coding mode determining unit; the difference image generating unit for generating a difference image between each of the blocks into which the inputted image is divided by the block dividing unit, and the prediction image generated by the prediction image generating unit; the image compression unit for compressing the difference image generated by the difference image generating unit, and outputting compressed data of the difference image; the local decoded image generating unit for decompressing the difference image compressed by the image compression unit, and adding the difference image decompressed thereby and the prediction image generated by the prediction image generating unit to generate a local decoded image; the distortion removing unit for carrying out a filtering process on the local decoded image generated by the local decoded image generating unit to remove a block distortion occurring in the local decoded image; and the coding unit for coding the compressed data outputted from the image compression unit and the coding mode determined by the coding mode determining unit to generate a bitstream into which coded data of the compressed data and coded data of the coding mode are multiplexed, in which when removing a block distortion occurring in the local decoded image, the distortion removing unit sets an intensity of a filter for removing the block distortion for each signal component according to the coding mode determined by the coding mode determining unit, there is provided an advantage of being able to improve the accuracy of removal of a block distortion, thereby improving the quality of the decoded image.

BRIEF DESCRIPTION OF THE FIGURES

FIG. 13 is an explanatory drawing showing a correspondence between Q (qP value of luminance) and parameters β and Tc;

EMBODIMENTS OF THE INVENTION

Figure 1:
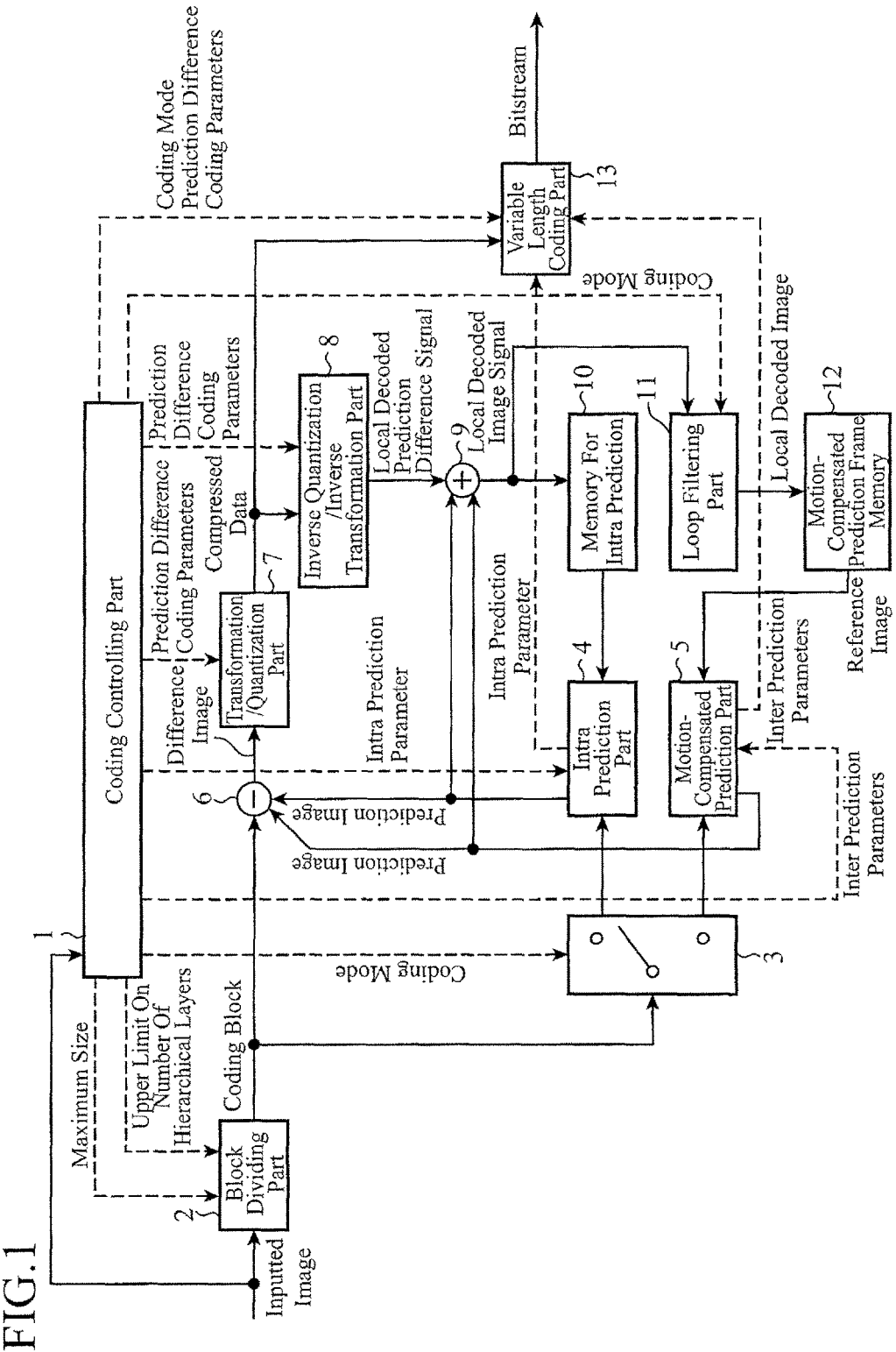
FIG. 1 is a block diagram showing an image coding device in accordance with Embodiment 1 of the present invention.

Hereafter, in order to explain this invention in greater detail, the preferred embodiments of the present invention will be described with reference to the accompanying drawings.

Embodiment 1

In this Embodiment 1, an image coding device that receives each frame image of a video, carries out variable length coding on the frame image after carrying out a compression process with an orthogonal transformation and quantization on a prediction difference signal which the image coding device acquires by carrying out a motion-compensated prediction between adjacent frames to generate a bitstream, and an image decoding device that decodes the bitstream outputted from the image coding device will be explained.

The image coding device in accordance with this Embodiment 1 is characterized in that the image coding device adapts itself to a local change of a video signal in space and time directions to divide the video signal into regions of various sizes, and carries out intra-frame and inter-frame adaptive coding. In general, a video signal has a characteristic of its complexity varying locally in space and time. There can be a case in which a pattern having a uniform signal characteristic in a relatively large image area, such as a sky image or a wall image, or a pattern having a complicated texture pattern in a small image area, such as a person image or a picture including a fine texture, also coexists on a certain video frame from the viewpoint of space. Also from the viewpoint of time, a relatively large image area, such as a sky image or a wall image, has a small local change in a time direction in its pattern, while an image of a moving person or object has a larger temporal change because its outline has a movement of a rigid body and a movement of a non-rigid body with respect to time.

Although in the coding process a process of generating a prediction difference signal having small signal power and small entropy by using a temporal and spatial prediction, thereby reducing the whole code amount, is carried out, the code amount of a parameter used for the prediction can be reduced as long as the parameter can be applied uniformly to as large an image signal region as possible. On the other hand, because the amount of errors occurring in the prediction increases when the same prediction parameter is applied to an image signal pattern having a large change in time and space, the code amount of the prediction difference signal cannot be reduced. Therefore, it is desirable to reduce the size of a region which is subjected to the prediction process when performing the prediction process on an image signal pattern having a large change in time and space, thereby reducing the electric power and entropy of the prediction difference signal even though the data volume of the parameter which is used for the prediction is increased. In order to carry out coding which is adapted for such the typical characteristics of a video signal, the image coding device in accordance with this Embodiment 1 hierarchically divides each region having a predetermined maximum block size of the video signal into blocks, and carries out the prediction process and the coding process of coding the prediction difference on each of the blocks into which each region is divided.

A video signal which is to be processed by the image coding device in accordance with this Embodiment 1 can be an arbitrary video signal in which each video frame consists of a series of digital samples (pixels) in two dimensions, horizontal and vertical, such as a YUV signal which consists of a luminance signal and two color difference signals, a color video image signal in arbitrary color space, such as an RGB signal, outputted from a digital image capturing sensor, a monochrome image signal, or an infrared image signal. The gradation of each pixel can be an 8-bit, 10-bit, or 12-bit one. In the following explanation, the inputted video signal is a YUV signal unless otherwise specified. It is further assumed that the two color difference components U and V are signals having a 4:2:0 format which are subsampled with respect to the luminance component Y. A data unit to be processed which corresponds to each frame of the video signal is referred to as a "picture." In this Embodiment 1, a "picture" is explained as a video frame signal on which progressive scanning has been carried out. When the video signal is an interlaced signal, a "picture" can be alternatively a field image signal which is a unit which constructs a video frame. Further, in the subsequent explanation, a group of spatially continuous coding blocks may be referred to as a "slice."

FIG. 1 is a block diagram showing the image coding device in accordance with Embodiment 1 of the present invention. Referring to FIG. 1, a coding controlling part 1 carries out a process of determining a maximum size of each of coding blocks which is a unit to be processed at a time when a motion-compensated prediction process (inter-frame prediction process) or an intra prediction process (intra-frame prediction process) is carried out, and also determining an upper limit on the number of hierarchical layers in a hierarchy in which each of the coding blocks having the maximum size is hierarchically divided into blocks. The coding controlling part 1 also carries out a process of selecting a coding mode suitable for each of the coding blocks into which each coding block having the maximum size is divided hierarchically from one or more available coding modes (one or more intra coding modes and one or more inter coding modes). The coding controlling part 1 constructs a coding mode determining unit.

A block dividing part 2 carries out a process of, when receiving a video signal showing an inputted image, dividing the inputted image shown by the video signal into coding blocks each having the maximum size determined by the coding controlling part 1, and also dividing each of the coding blocks into blocks hierarchically until the number of hierarchical layers reaches the upper limit on the number of hierarchical layers which is determined by the coding controlling part 1. The block dividing part 2 constructs a block dividing unit.

A selection switch 3 carries out a process of, when the coding mode selected by the coding controlling part 1 for the coding block, which is generated through the division by the block dividing part 2, is an intra coding mode, outputting the coding block to an intra prediction part 4, and, when the coding mode selected by the coding controlling part 1 for the coding block, which is generated through the division by the block dividing part 2, is an inter coding mode, outputting the coding block to a motion-compensated prediction part 5. The intra prediction part 4 carries out a process of, when receiving the coding block, which is generated through the division by the block dividing part 2, from the selection switch 3, carrying out an intra prediction process on the coding block to generate a prediction image by using an intra prediction parameter outputted from the coding controlling part 1 while referring to the local decoded image (reference image) of an already-coded block stored in a memory 10 for intra prediction.

The motion-compensated prediction part 5 carries out a process of, when receiving the coding block, which is generated through the division by the block dividing part 2, from the selection switch 3, making a motion search by comparing the coding block with the local decoded image (reference image) of an already-coded block stored in a motion-compensated prediction frame memory 12 to calculate a motion vector, and carries out an inter prediction process (motion-compensated prediction process) on the coding block by using both the motion vector and inter prediction parameters outputted from the coding controlling part 1 to generate a prediction image. A prediction image generating unit is comprised of the selection switch 3, the intra prediction part 4, and the motion-compensated prediction part 5.

A subtracting part 6 carries out a process of subtracting the prediction image generated by the intra prediction part 4 or the motion-compensated prediction part 5 from the coding block, which is generated through the division by the block dividing part 2, to generate a difference image (=the coding block–the prediction image). The subtracting part 6 constructs a difference image generating unit. A transformation/quantization part 7 carries out a process of performing an orthogonal transformation process (e.g., a DCT (discrete cosine transform) or an orthogonal transformation process, such as a KL transform, in which bases are designed for a specific learning sequence in advance) on the difference image generated by the subtracting part 6 in units of a block having a transformation block size included in prediction difference coding parameters outputted from the coding controlling part 1, and also quantizing the transform coefficients of the difference image by using a quantization parameter included in the prediction difference coding parameters to output the transform coefficients quantized thereby as compressed data of the difference image. The transformation/quantization part 7 constructs an image compression unit.

An inverse quantization/inverse transformation part 8 carries out a process of inverse-quantizing the compressed data outputted from the transformation/quantization part 7 by using the quantization parameter included in the prediction difference coding parameter outputted from the coding controlling part 1, and performing an inverse transformation process (e.g., an inverse DCT (inverse discrete cosine transform) or an inverse transformation process such as an inverse KL transform) on the compressed data inverse-quantized thereby in units of a block having the transformation block size included in the prediction difference coding parameters to output the compressed data on which the inverse quantization/inverse transformation part has carried out the inverse transformation process as a local decoded prediction difference signal (data showing the difference image decompressed). An adding part 9 carries out a process of adding the local decoded prediction difference signal outputted from the inverse quantization/inverse transformation part 8 and the prediction signal showing the prediction image generated by the intra prediction part 4 or the motion-compensated prediction part 5 to generate a local decoded image signal showing a local decoded image. A local decoded image is comprised of the inverse quantization/inverse transformation part 8 and the adding part 9.

The memory 10 for intra prediction is a recording medium, such as a RAM, for storing the local decoded image shown by the local decoded image signal generated by the adding part 9 as an image which the intra prediction part 4 will use when performing the intra prediction process the next time.

A loop filtering part 11 carries out a process of performing a filtering process (loop filtering process) on the local decoded image signal generated by the adding part 9 to remove a distortion (block distortion) occurring at a block boundary. When removing a block distortion of the local decoded image, the loop filtering part 11 sets the intensity of a filter for removing the block distortion for each of the signal components (the luminance signal component and the color difference signal components) according to the coding mode (an intra coding mode or an inter coding mode) selected by the coding controlling part 1. The loop filtering part 11 constructs a distortion removing unit.

The motion-compensated prediction frame memory 12 is a recording medium, such as a RAM, for storing the local decoded image on which the loop filtering part 11 has carried out the filtering process as a reference image which the motion-compensated prediction part 5 will use when performing the motion-compensated prediction process the next time.

A variable length coding part 13 carries out a process of variable-length-coding the compressed data outputted from the transformation/quantization part 7, the coding mode and the prediction difference coding parameters which are outputted from the coding controlling part 1, and the intra prediction parameter outputted from the intra prediction part 4 or the inter prediction parameters (including the motion vector) outputted from the motion-compensated prediction part 5 to generate a bitstream into which coded data of the compressed data, coded data of the coding mode, coded data of the prediction difference coding parameters, and coded data of the intra prediction parameter or the inter prediction parameters are multiplexed. The variable length coding part 13 constructs a coding unit.

Figure 2:
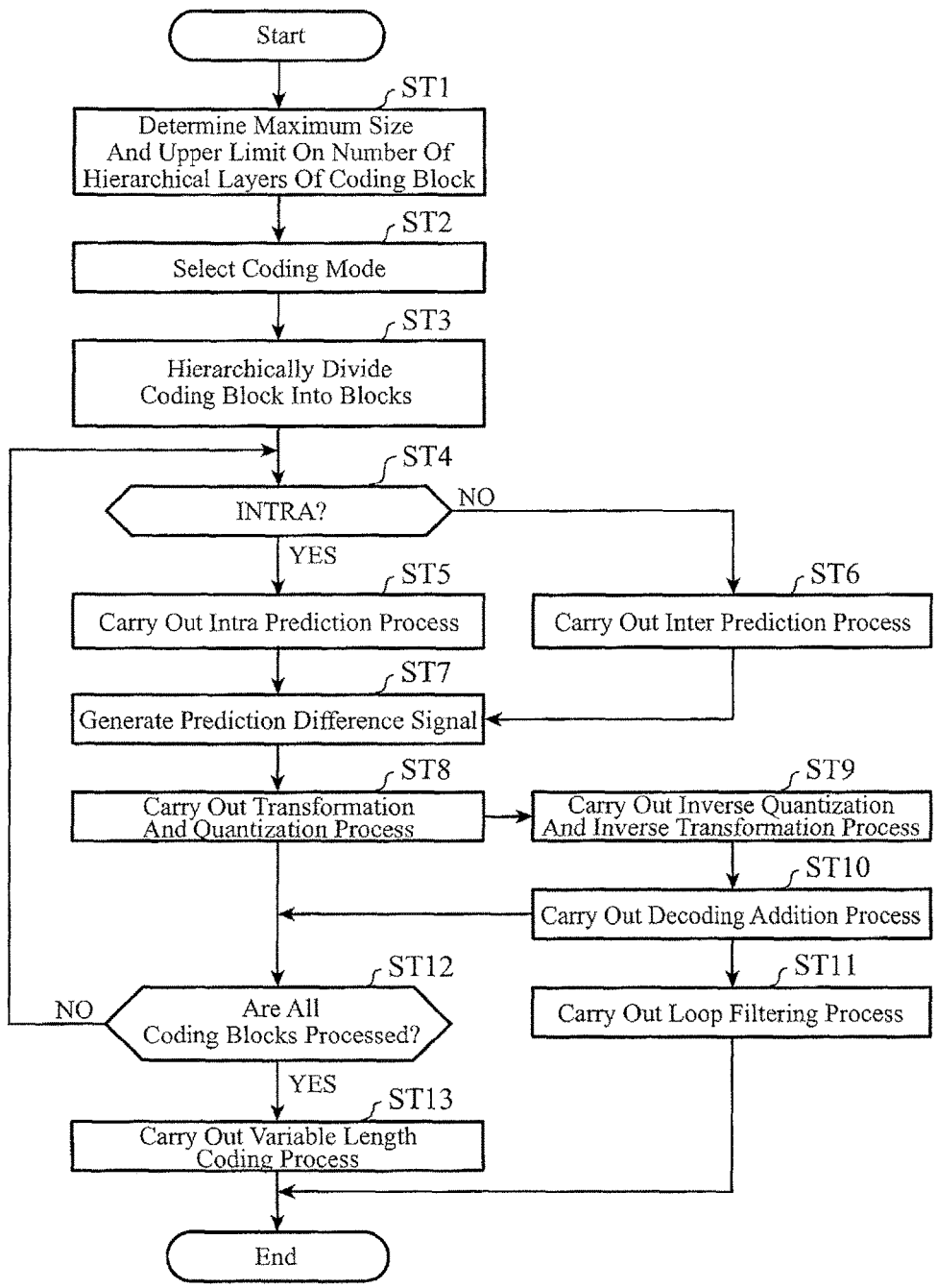
FIG. 2 is a flow chart showing processing carried out by the image coding device in accordance with Embodiment 1 of the present invention.

In the example of FIG. 1, the coding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filtering part 11, and the variable length coding part 13, which are the components of the image coding device, can consist of pieces of hardware for exclusive use (e.g., semiconductor integrated circuits in each of which a CPU is mounted, one chip microcomputers, or the like), respectively. As an alternative, the image coding device can consist of a computer, and a program in which the processes carried out by the coding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filtering part 11, and the variable length coding part 13 are described can be stored in a memory of the computer and the CPU of the computer can be made to execute the program stored in the memory. FIG. 2 is a flow chart showing the processing carried out by the image coding device in accordance with Embodiment 1 of the present invention.

Figure 3:
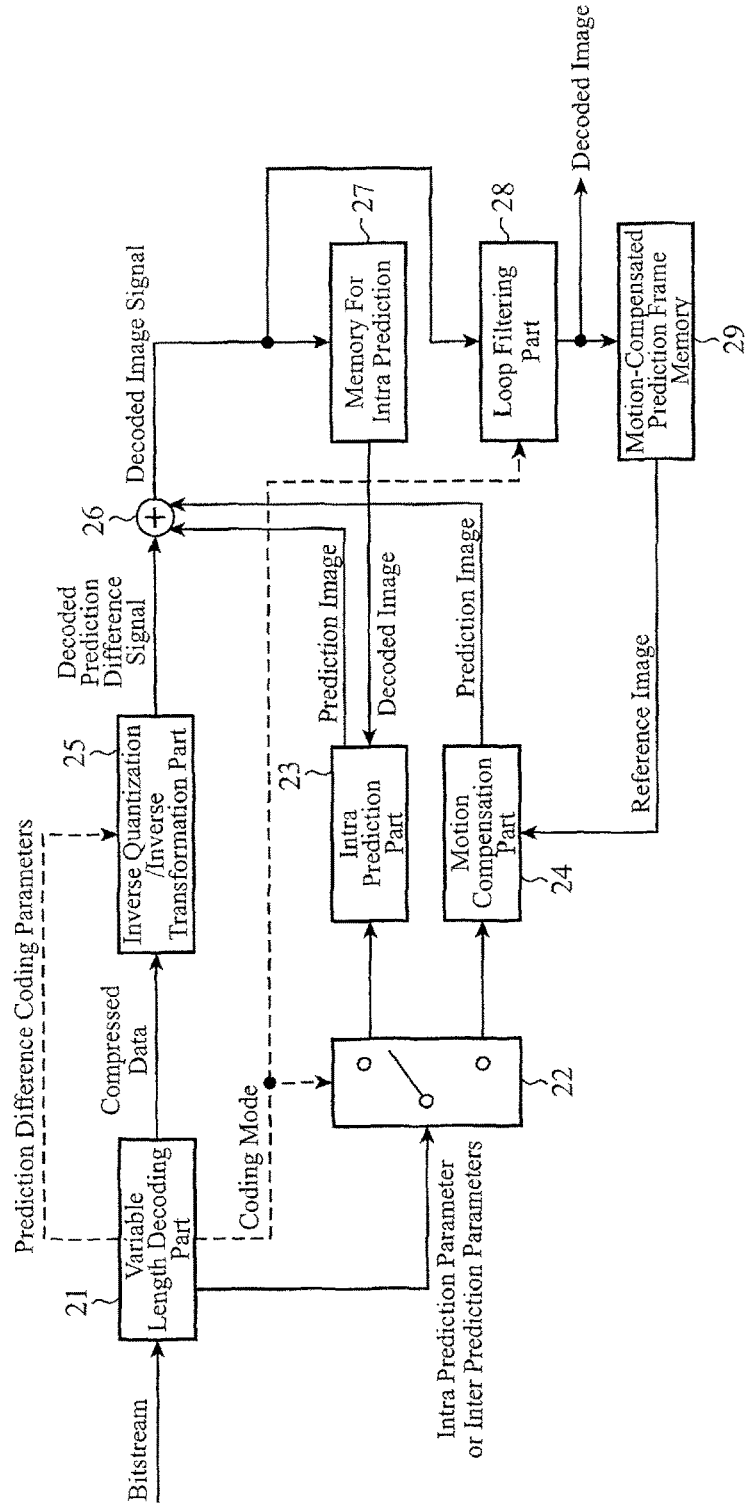
FIG. 3 is a block diagram showing an image decoding device in accordance with Embodiment 1 of the present invention.

FIG. 3 is a block diagram showing the image decoding device in accordance with Embodiment 1 of the present invention. Referring to FIG. 3, a variable length decoding part 21 carries out a process of variable-length-decoding the coded data multiplexed into the bitstream to acquire the compressed data, the coding mode, the prediction difference coding parameters, and the intra prediction parameter or the inter prediction parameters (including the motion vector), which are associated with each of coding blocks into which each frame of the video is hierarchically divided, and outputting the compressed data and the prediction difference coding parameters to an inverse quantization/inverse transformation part 25 and also outputting the coding mode, and the intra prediction parameter or the inter prediction parameters to a selection switch 22, and further outputting the coding mode to a loop filtering part 28. The variable length decoding part 21 constructs a decoding unit.

The selection switch 22 carries out a process of, when the coding mode associated with a coding block, which is outputted from the variable length decoding part 21, is an intra coding mode, outputting the intra prediction parameter outputted thereto from the variable length decoding part 21 to an intra prediction part 23, and, when the coding mode is an inter coding mode, outputting the inter prediction parameters outputted thereto from the variable length decoding part 21 to a motion-compensated prediction part 24. The intra prediction part 23 carries out a process of performing an intra prediction process on the coding block to generate a prediction image by using the intra prediction parameter outputted from the selection switch 22 while referring to the decoded image (reference image) of an already-decoded block stored in a memory 27 for intra prediction.

The motion compensation part 24 carries out a process of performing an inter prediction process on the coding block to generate a prediction image by using the motion vector included in the inter prediction parameters outputted from the selection switch 22, and the decoded image (reference image) of an already-decoded block stored in a motion-compensated prediction frame memory 29. A prediction image generating unit is comprised of the selection switch 22, the intra prediction part 23, and the motion compensation part 24.

The inverse quantization/inverse transformation part 25 carries out a process of inverse-quantizing the compressed data which is outputted thereto from the variable length decoding part 21 by using the quantization parameter included in the prediction difference coding parameters outputted thereto from the variable length decoding part 21, and performing an inverse transformation process (e.g., an inverse DCT (inverse discrete cosine transform) or an inverse transformation process such as an inverse KL transform) on the compressed data inverse-quantized thereby in units of a block having the transformation block size included in the prediction difference coding parameters, and outputting the compressed data on which the inverse quantization/inverse transformation part has carried out the inverse transformation process as a decoded prediction difference signal (signal showing a pre-compressed difference image). The inverse quantization/inverse transformation part 25 constructs a difference image generating unit.

An adding part 26 carries out a process of adding the decoded prediction difference signal outputted thereto from the inverse quantization/inverse transformation part 25 and the prediction signal showing the prediction image generated by the intra prediction part 23 or the motion-compensated prediction part 24 to generate a decoded image signal showing a decoded image. The adding part 26 constructs the decoded image generating unit. The memory 27 for intra prediction is a recording medium, such as a RAM, for storing the decoded image shown by the decoded image signal generated by the adding part 26 as an image which the intra prediction part 23 will use when performing the intra prediction process the next time.

A loop filtering part 28 carries out a process of performing a filtering process (loop filtering process) on the decoded image signal generated by the adding part 26 to remove a distortion (block distortion) occurring at a block boundary. When removing a block distortion of the decoded image, the loop filtering part 28 sets the intensity of a filter for removing the block distortion for each of the signal components (the luminance signal component and the color difference signal components) according to the coding mode (an intra coding mode or an inter coding mode) outputted thereto from the variable length decoding part 21. The loop filtering part 28 constructs a distortion removing unit.

The motion-compensated prediction frame memory 29 is a recording medium, such as a RAM, for storing the decoded image on which the loop filter part 28 has carried out the filtering process as a reference image which the motion-compensated prediction part 24 will use when performing the motion-compensated prediction process the next time.

Figure 4:
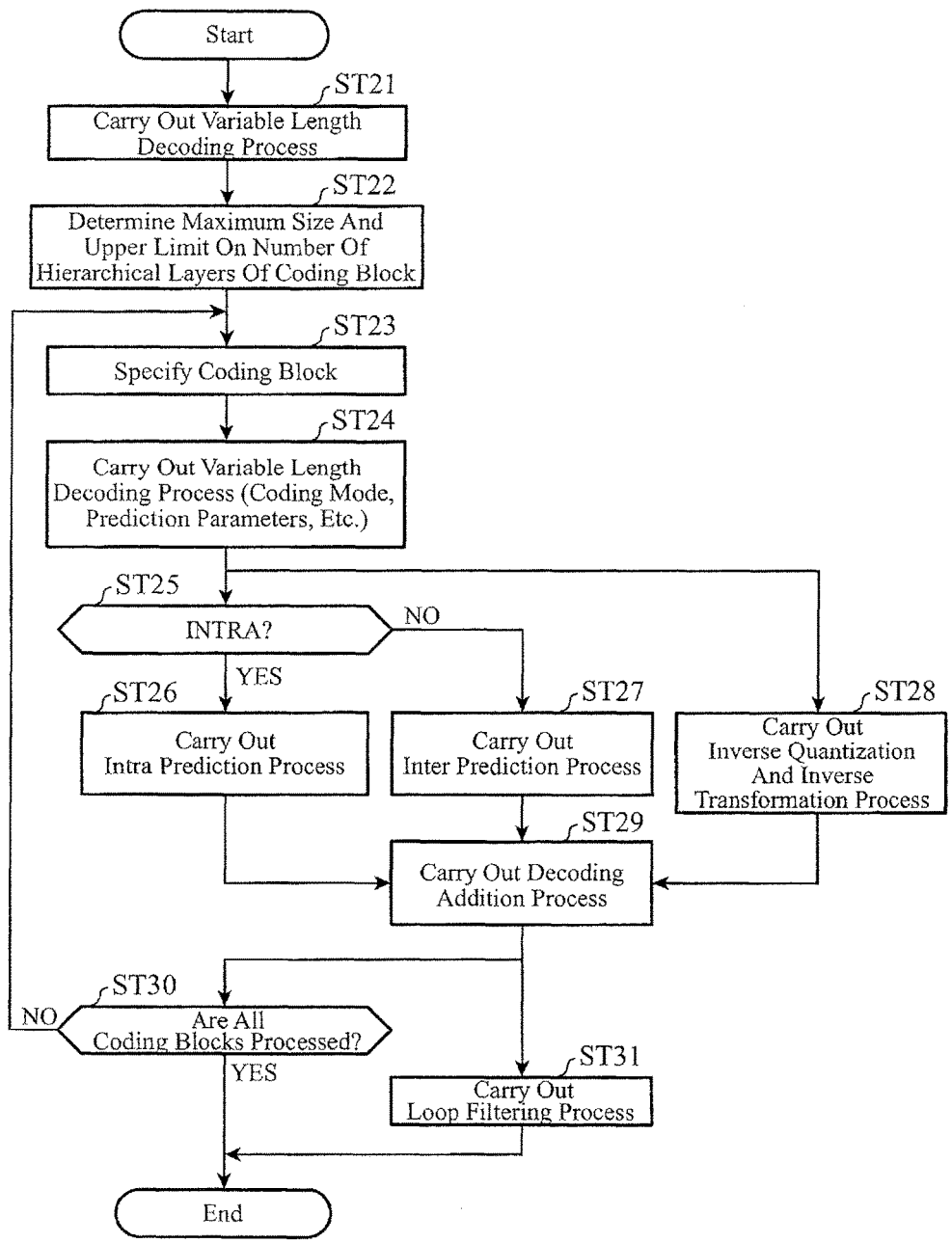
FIG. 4 is a flow chart showing processing carried out by the image decoding device in accordance with Embodiment 1 of the present invention.

In the example of FIG. 3, the variable length decoding part 21, the selection switch 22, the intra prediction part 23, the motion-compensated prediction part 24, the inverse quantization/inverse transformation part 25, the adding part 26, and the loop filtering part 28, which are the components of the image decoding device, can consist of pieces of hardware for exclusive use (e.g., integrated circuits in each of which a CPU is mounted, one chip microcomputers, or the like), respectively. As an alternative, the image decoding device can consist of a computer, and a program in which the processes carried out by the variable length decoding part 21, the selection switch 22, the intra prediction part 23, the motion-compensated prediction part 24, the inverse quantization/inverse transformation part 25, the adding part 26, and the loop filtering part 28 are described can be stored in a memory of the computer and the CPU of the computer can be made to execute the program stored in the memory. FIG. 4 is a flow chart showing the processing carried out by the image decoding device in accordance with Embodiment 1 of the present invention.

Next, the operation of the image coding device and the operation of the image decoding device will be explained. First, the processing carried out by the image coding device shown in FIG. 1 will be explained. First, the coding controlling part 1 determines a maximum size of each of coding blocks which is a unit to be processed at a time when a motion-compensated prediction process (inter-frame prediction process) or an intra prediction process (intra-frame prediction process) is carried out, and also determines an upper limit on the number of hierarchical layers in a hierarchy in which each of the coding blocks having the maximum size is hierarchically divided into blocks (step ST1 of FIG. 2).

As a method of determining the maximum size of each of coding blocks, for example, there can be considered a method of determining a maximum size for all the pictures according to the resolution of the inputted image. Further, there can be considered a method of quantifying a variation in the complexity of a local movement of the inputted image as a parameter and then determining a small size for a picture having a large and vigorous movement while determining a large size for a picture having a small movement. As a method of determining the upper limit on the number of hierarchical layers, for example, there can be considered a method of increasing the depth of the hierarchy, i.e., the number of hierarchical layers to make it possible to detect a finer movement as the inputted image has a larger and more vigorous movement, or decreasing the depth of the hierarchy, i.e., the number of hierarchical layers as the inputted image has a smaller movement.

The coding controlling part 1 also selects a coding mode suitable for each of the coding blocks into which each coding block having the maximum size is divided hierarchically from one or more available coding modes (M intra coding modes and N inter coding modes) (step ST2). Although a detailed explanation of the selection method of selecting a coding mode for use in the coding controlling part 1 will be omitted because the selection method is a known technique, there is a method of carrying out a coding process on the coding block by using an arbitrary available coding mode to examine the coding efficiency and select a coding mode having the highest level of coding efficiency from among a plurality of available coding modes, for example.

Figure 5:
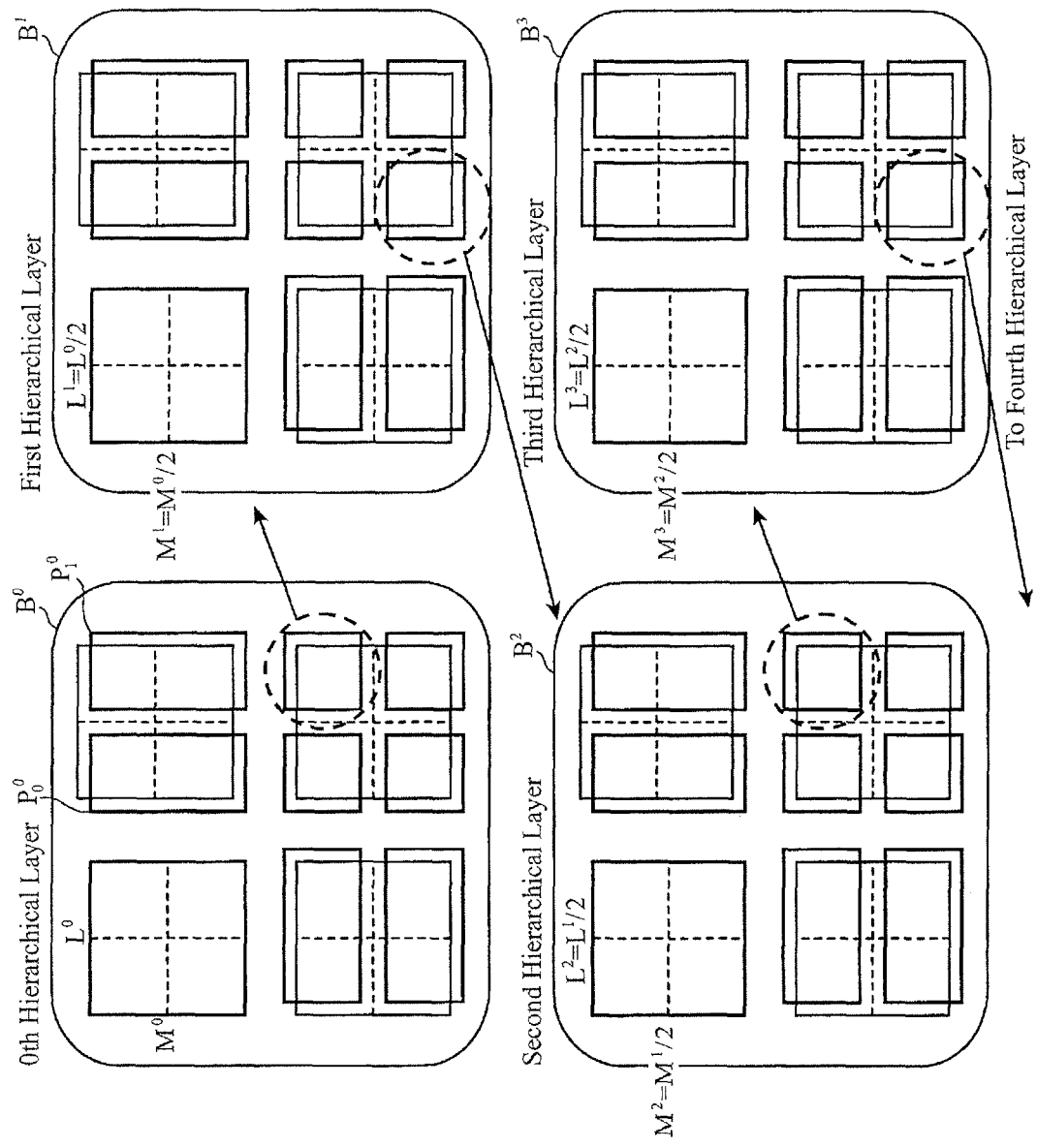
FIG. 5 is an explanatory drawing showing a state in which each coding block having a maximum size is hierarchically divided into a plurality of coding blocks.

When receiving the video signal showing the inputted image, the block dividing part 2 divides the inputted image shown by the video signal into coding blocks each having the maximum size determined by the coding controlling part 1, and also divides each of the coding blocks into blocks hierarchically until the number of hierarchical layers reaches the upper limit on the number of hierarchical layers which is determined by the coding controlling part 1 (step ST3). FIG. 5 is an explanatory drawing showing a state in which each coding block having the maximum size is hierarchically divided into a plurality of coding blocks. In the example of FIG. 5, each coding block having the maximum size is a coding block $B^0$ in the 0th hierarchical layer, and its luminance component has a size of $(L^0, M^0)$. Further, in the example of FIG. 5, by carrying out the hierarchical division with this coding block $B^0$ having the maximum size being set as a starting point until the depth of the hierarchy reaches a predetermined depth which is set separately according to a quadtree structure, coding blocks $B^n$ can be acquired.

At the depth of n, each coding block $B^n$ is an image region having a size of $(L^n, M^n)$. Although $L^n$ can be the same as or differ from $M^n$, the case of $L^n=M^n$ is shown in the example of FIG. 5. Hereafter, the size of each coding block $B^n$ is defined as the size of $(L^n, M^n)$ in the luminance component of the coding block $B^n$.

Because the block dividing part 2 carries out a quadtree division, $(L^{n+1}, M^{n+1})=(L^n/2, M^n/2)$ is always established. In the case of a color video image signal (4:4:4 format) in which all the color components have the same sample number, such as an RGB signal, all the color components have a size of $(L^n, M^n)$, while in the case of handling a 4:2:0 format, a corresponding color difference component has a coding block size of $(L^n/2, M^n/2)$. Hereafter, a coding mode selectable for each coding block $B^n$ in the nth hierarchical layer is expressed as $m(B^n)$.

In the case of a color video signal which consists of a plurality of color components, the coding mode $m(B^n)$ can be configured in such a way that an individual mode is used for each color component. Hereafter, an explanation will be made by assuming that the coding mode $m(B^n)$ indicates the one for the luminance component of each coding block having a 4:2:0 format in a YUV signal unless otherwise specified. The coding mode $m(B^n)$ can be one of one or more intra coding modes (generically referred to as "INTRA") or one or more inter coding modes (generically referred to as "INTER"), and the coding controlling part 1 selects, as the coding mode $m(B^n)$, a coding mode with the highest degree of coding efficiency for each coding block $B^n$ from among all the coding modes available in the picture currently being processed or a subset of these coding modes, as mentioned above.

Each coding block $B^n$ is further divided into one or more prediction units (partitions) by the block dividing part, as shown in FIG. 5. Hereafter, each partition belonging to each coding block $B^n$ is expressed as $P_i^n$ (i shows a partition number in the nth hierarchical layer). How the division of each coding block $B^n$ into partitions $P_i^n$ belonging to the coding block $B^n$ is carried out is included as information in the coding mode $m(B^n)$. While the prediction process is carried out on each of all the partitions $P_i^n$ according to the coding mode $m(B^n)$, an individual prediction parameter can be selected for each partition $P_i^n$.

Figure 6:
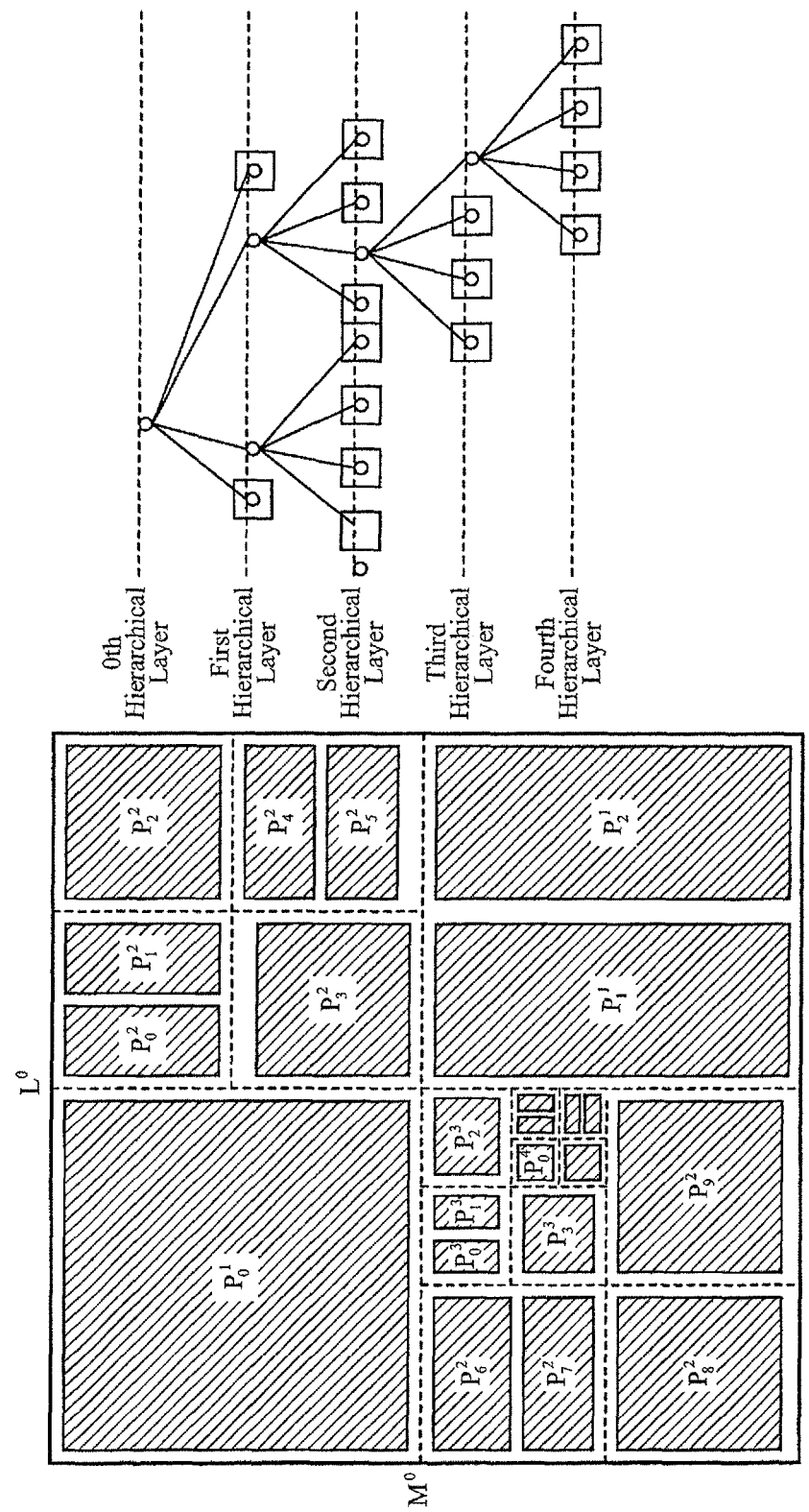
FIG. 6(a) is an explanatory drawing showing a distribution of partitions into which a coding block is divided.
FIG. 6(b) is an explanatory drawing showing a state in which a coding mode m(B$^n$) is assigned to each of the partitions after a hierarchical layer division is performed by using a quadtree graph.

The coding controlling part 1 produces such a block division state as shown in, for example, FIG. 6 for each coding block having the maximum size, and then determines coding blocks $B^n$. Hatched portions shown in FIG. 6(a) show a distribution of partitions into which each coding block having the maximum size is divided, and FIG. 6(b) shows a situation in which coding modes $m(B^n)$ are respectively assigned to the partitions generated through the hierarchical layer division by using a quadtree graph. Each node enclosed by □ shown in FIG. 6(b) is a node (coding block $B^n$) to which a coding mode $m(B^n)$ is assigned.

When the coding controlling part 1 selects an optimal coding mode $m(B^n)$ for each partition $P_i^n$ of each coding block $B^n$, and the coding mode $m(B^n)$ is an intra coding mode (step ST4), the selection switch 3 outputs the partition $P_i^n$ of the coding block $B^n$, which is generated through the division by the block dividing part 2, to the intra prediction part 4. In contrast, when the coding mode $m(B^n)$ is an inter coding mode (step ST4), the selection switch outputs the partition $P_i^n$ of the coding block $B^n$, which is generated through the division by the block dividing part 2, to the motion-compensated prediction part 5.

When receiving the partition $P_i^n$ of the coding block $B^n$ from the selection switch 3, the intra prediction part carries out an intra prediction process on the partition $P_i^n$ of the coding block $B^n$ by using the intra prediction parameter corresponding to the coding mode $m(B^n)$ selected by the coding controlling part 1 to generate an intra prediction image $P_i^n$ while referring to the local decoded image of an already-coded block stored in the memory 10 for intra prediction (step ST5). The intra prediction part 4 outputs the intra prediction image $P_i^n$ to the subtracting part 6 and the adding part 9 after generating the intra prediction image $P_i^n$, while outputting the intra prediction parameter to the variable length coding part 13 to enable the image decoding device shown in FIG. 3 to generate the same intra prediction image $P_i^n$. Although the intra prediction part 4 carries out the intra prediction process in compliance with, for example, the algorithm determined by the AVC/H.264 standards (ISO/IEC 14496-10), the algorithm with which the intra prediction part complies is not limited to this algorithm.

When receiving the partition $P_i^n$ of the coding block $B^n$ from the selection switch 3, the motion-compensated prediction part 5 makes a motion search by comparing the partition $P_i^n$ of the coding block $B^n$ with the local decoded image of an already-coded block stored in the motion-compensated prediction frame memory 12 to calculate a motion vector, and carries out an inter prediction process on the coding block by using both the motion vector and the inter prediction parameters outputted from the coding controlling part 1 to generate an inter prediction image $P_i^n$ (step ST6).

The motion-compensated prediction part 5 outputs the inter prediction image $P_i^n$ to the subtracting part 6 and the adding part 9 after generating the inter prediction image $P_i^n$, while outputting the inter prediction parameters to the variable length coding part 13 to enable the image decoding device shown in FIG. 3 to generate the same inter prediction image $P_i^n$. The inter prediction parameters include the following pieces of information:
(1) Mode information in which the division of the coding block $B^n$ into partitions $P_i^n$ is described;
(2) The motion vector of the partition $P_i^n$;
(3) Reference image indication index information showing which reference image is used for performing an inter prediction process when the motion-compensated prediction frame memory 12 stores a plurality of local decoded images (reference images);
(4) Index information showing which motion vector predicted value is selected and used when there are a plurality of motion vector predicted value candidates;
(5) Index information showing which filter is selected and used when there are a plurality of motion compensation interpolation filters; and
(6) Selection information showing which pixel accuracy is used when the motion vector of the partition $P_i^n$ can show a plurality of degrees of pixel accuracy (half pixel, ¼ pixel, ⅛ pixel, etc.).

After the intra prediction part 4 or the motion-compensated prediction part 5 generates a prediction image (an intra prediction image $P_i^n$ or an inter prediction image $P_i^n$), the subtracting part 6 subtracts the prediction image (the intra prediction image $P_i^n$ or the inter prediction image $P_i^n$) generated by the intra prediction part 4 or the motion-compensated prediction part 5 from the partition $P_i^n$ of the coding block $B^n$, which is generated through the division by the block dividing part 2, to generate a difference image, and outputs a prediction difference signal $e_i^n$ showing the difference image to the transformation/quantization part 7 (step ST7).

When receiving the prediction difference signal $e_i^n$ showing the difference image from the subtracting part 6, the transformation/quantization part 7 carries out a transforming process (e.g., a DCT (discrete cosine transform) or an orthogonal transformation process, such as a KL transform, in which bases are designed for a specific learning sequence in advance) on the difference image in units of a block having the transformation block size included in the prediction difference coding parameters outputted thereto from the coding controlling part 1, and quantizes the transform coefficients of the difference image by using the quantization parameter included in the prediction difference coding parameters and outputs the transform coefficients quantized thereby to the inverse quantization/inverse transformation part 8 and the variable length coding part 13 as compressed data of the difference image (step ST8).

When receiving the compressed data of the difference image from the transformation/quantization part 7, the inverse quantization/inverse transformation part 8 inverse-quantizes the compressed data of the difference image by using the quantization parameter included in the prediction difference coding parameters outputted thereto from the coding controlling part 1, performs an inverse transformation process (e.g., an inverse DCT (inverse discrete cosine transform) or an inverse transformation process such as an inverse KL transform) on the compressed data inverse-quantized thereby in units of a block having the transformation block size included in the prediction difference coding parameters, and outputs the compressed data on which the inverse quantization/inverse transformation part has carried out the inverse transformation process as a local decoded prediction difference signal to the adding part 9 (step ST9).

When receiving the local decoded prediction difference signal from the inverse quantization/inverse transformation part 8, the adding part 9 adds the local decoded prediction difference signal and the prediction signal showing the prediction image (the intra prediction image $P_i^n$ or the inter prediction image $P_i^n$) generated by the intra prediction part 4 or the motion-compensated prediction part 5 to generate a local decoded image which is a local decoded partition image or a local decoded coding block image which is a group of local decoded partition images (step ST10). After generating the local decoded image, the adding part 9 stores a local decoded image signal showing the local decoded image in the memory 10 for intra prediction and also outputs the local decoded image signal to the loop filtering part 11.

When receiving the local decoded image signal from the adding part 9, the loop filtering part 11 carries out a filtering process on the local decoded image signal to remove a distortion (block distortion) occurring at a block boundary (step ST11). Although the details of the processing carried out by the loop filtering part 11 will be mentioned below, when removing a block distortion of the local decoded image, the loop filtering part 11 sets the intensity of a filter for removing the block distortion for each of the signal components (the luminance signal component and the color difference signal components) according to the coding mode (an intra coding mode or an inter coding mode) selected by the coding controlling part 1. The loop filtering part 11 can carry out the filtering process on each coding block having the maximum size of the local decoded image signal outputted thereto from the adding part 9 or each coding block. As an alternative, after the local decoded image signals corresponding to all the macroblocks of one screen are outputted, the loop filtering part can carry out the filtering process on all the macroblocks of the one screen at a time.

The image coding device repeatedly carries out the processes of steps ST4 to ST10 until the image coding device completes the processing on all the coding blocks $B^n$ into which the inputted image is divided hierarchically, and, when completing the processing on all the coding blocks $B^n$, shifts to a process of step ST13 (step ST12).

The variable length coding part 13 entropy-encodes the compressed data outputted thereto from the transformation/quantization part 7, the coding mode (including the information showing the state of the division into the coding blocks) and the prediction difference coding parameters, which are outputted thereto from the coding controlling part 1, and the intra prediction parameter outputted thereto from the intra prediction part 4 or the inter prediction parameters (including the motion vector) outputted thereto from the motion-compensated prediction part 5. The variable length coding part 13 multiplexes coded data which are the coded results of the entropy coding of the compressed data, the coding mode, the prediction difference coding parameters, and the intra prediction parameter or the inter prediction parameters to generate a bitstream (step ST13).

Figure 7:
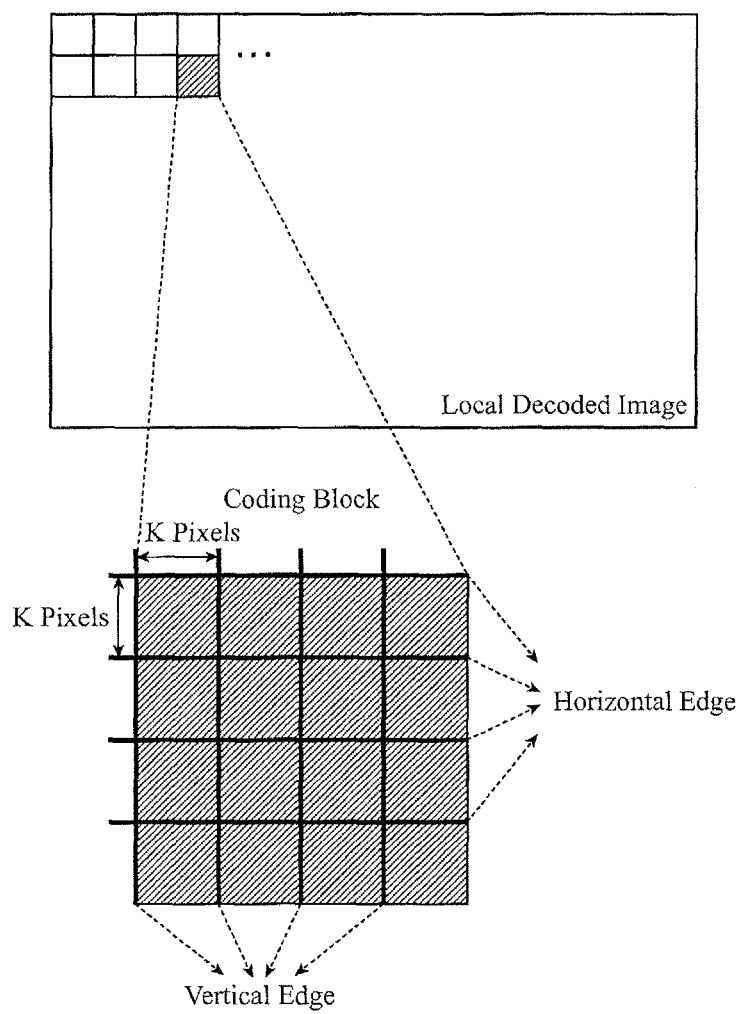
FIG. 7 is an explanatory drawing showing the positions of pixels in a coding block to each of which a filter is applied.

Hereafter, the filtering process carried out by the loop filtering part 11 will be explained concretely. The loop filtering part 11 is a nonlinear smoothing filter for reducing a block noise which can occur at a boundary between partitions or transformation blocks each of which is a prediction unit mentioned above. FIG. 7 is an explanatory drawing showing the positions of pixels in a coding block to which the filter is applied. In FIG. 7, a position where a vertical edge or a horizontal edge overlaps a boundary between partitions or transformation blocks is subjected to the filtering process. In FIG. 7, each of the vertical and horizontal edges is expressed by a K×K-pixel grid. The value of K can be determined to be a fixed value, or can be set according to the maximum size of the coding block, the maximum size of each of the partitions or transformation blocks, or the like.

Figure 8:
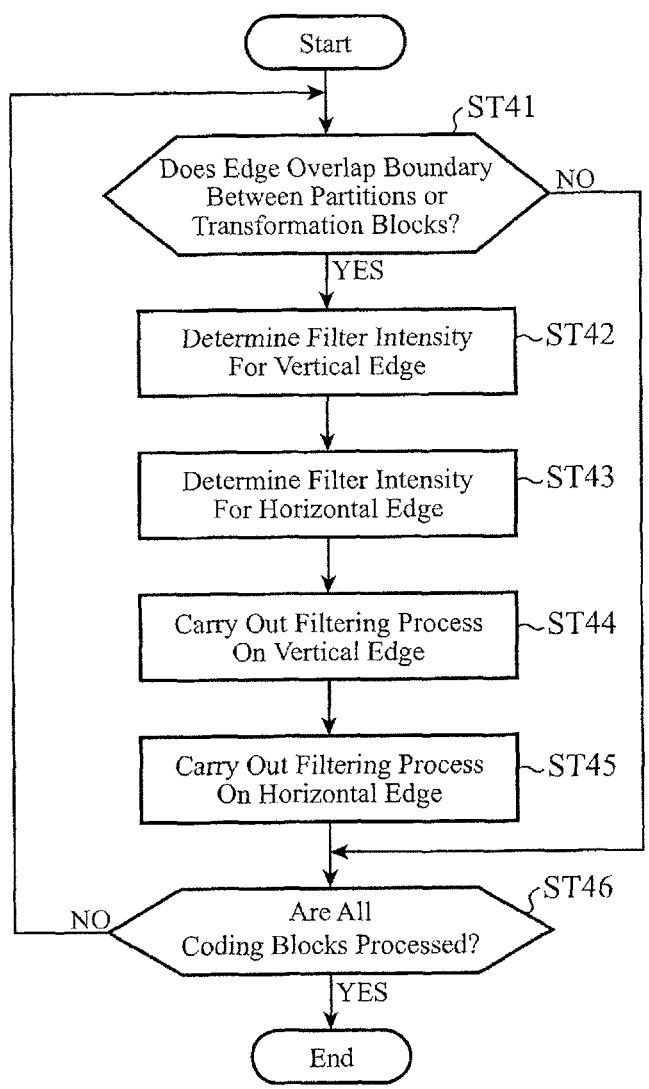
FIG. 8 is a flow chart showing processing carried out by a loop filtering part 11.

FIG. 8 is a flow chart showing the process carried out by the loop filtering part 11. The loop filtering part 11 carries out the filtering process on each of the coding blocks. The loop filtering part 11 determines whether a vertical edge or a horizontal edge overlaps a boundary between partitions or transformation blocks first (step ST41). When there is a vertical edge or a horizontal edge overlapping a boundary between partitions or transformation blocks, the loop filtering part 11 carries out determination of the intensity of the filter applied to the part where the vertical edge or the horizontal edge overlaps the boundary (steps ST42 and ST43). A method of determining the filter intensity will be mentioned below.

After determining the intensity of the filter, the loop filtering part 11 carries out the filtering process while changing the final intensity of the filter according to the result of the determination of the filter intensity and the amount of change in the values of pixels which are the target for the filtering process (steps ST44 and ST45). A method for use in the filtering process will be mentioned below. The loop filtering part 11 repeatedly carries out the processes of steps ST41 to ST45 until the processes on all the coding blocks in the picture are completed (step ST46). Identification information showing whether the loop filtering part carries out this loop filtering process on each of all the coding blocks in each slice is multiplexed into its slice header, and the image coding device is constructed in such a way as to determine the value of the identification information according to the conditions and transmit the value to the image decoding device.

Figure 9:
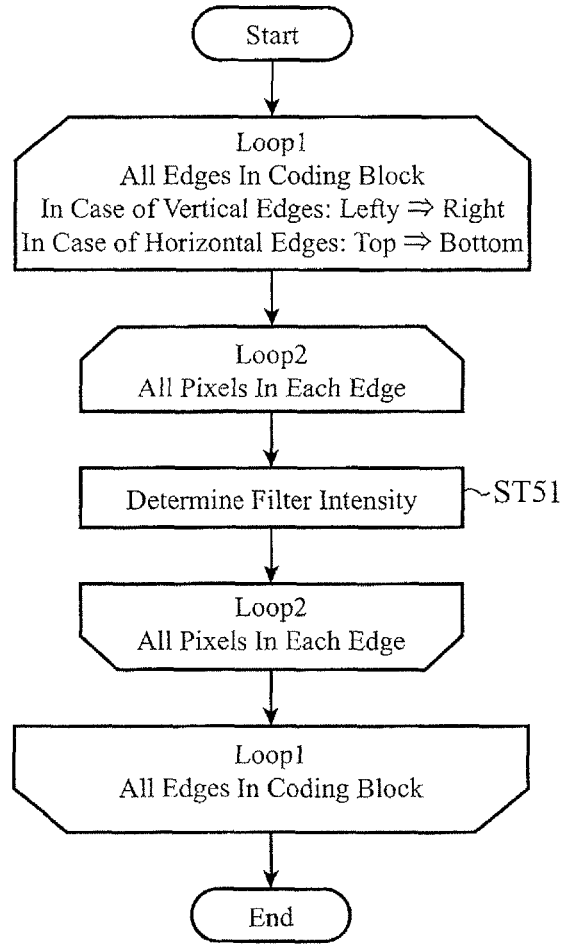
FIG. 9 is a flow chart showing a method of determining a filter intensity.
Figure 10:
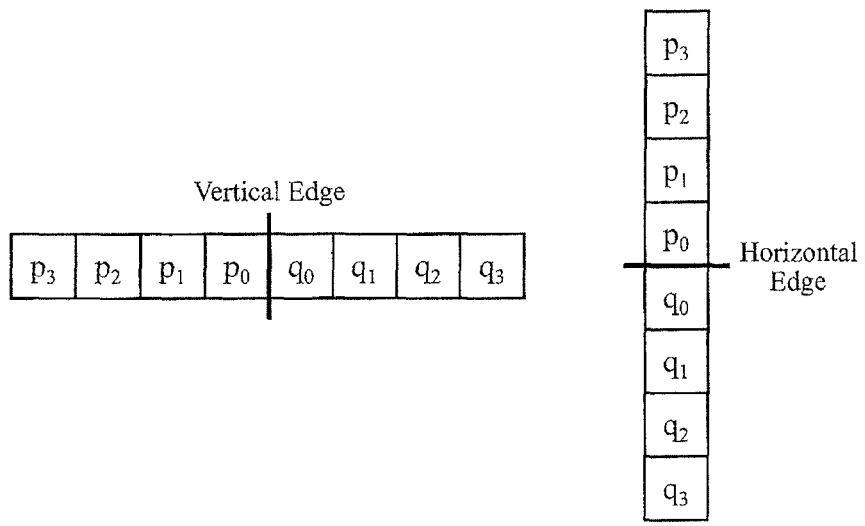
FIG. 10 is an explanatory drawing showing a relationship between the position of an edge and the positions of pixels.

Next, the process of determining the filter intensity which is carried out by the loop filtering part 11 will be explained. FIG. 9 is a flow chart showing a method of determining the filter intensity. The loop filtering part 11 determines the filter intensity bS for all of pixels adjacent to a vertical edge or a horizontal edge according to the following conditions (step ST51). In the following explanation, each pixel close to an edge is expressed by the following symbol $p_i$ (i=0, 1, 2, 3) or $q_j$ (j=0, 1, 2, 3), and a relationship between the position of an edge and the position of each pixel is defined as shown in FIG. 10.

The coding blocks include blocks for luminance signal component and blocks for color difference signal components, and the loop filtering part 11 determines the filter intensity according the following conditions.
(1) Whether the coding mode of the coding block which is the target for filtering process is an intra coding mode or an inter coding mode.
(2) Whether the signal component which is the target for filtering process is a luminance signal component or a color difference signal component?
(3) Whether or not a non-zero transform coefficient is included in the transformation block including the pixel which is the target for filtering process.
(4) The state of the motion parameter in the partition including the pixel which is the target for filtering process.

The loop filtering part 11 determines the filter intensity according to the following procedure.
(Step 1)
When an edge is located at a boundary between coding blocks, and the coding mode of the coding block including $p_0$ or the coding block including $q_0$ is an "intra coding mode," the loop filtering part determines the filter intensity for the target signal component for filtering process that is a luminance signal component as bS=2, and determines the filter intensity for the target signal component for filtering process that is a color difference signal component as bS=4.
(Step 2)
When the condition shown in step 1 is not satisfied, and the coding mode of the coding block including $p_0$ or the coding block including $q_0$ is an "intra coding mode," the loop filtering part determines the filter intensity for the target signal component for filtering process that is a luminance signal component as bS=1, and determines the filter intensity for the target signal component for filtering process that is a color difference signal component as bS=3.
(Step 3)
When the conditions shown in steps 1 and 2 are not satisfied, and $p_0$ or $q_0$ belongs to a transformation block having a non-zero orthogonal transformation coefficient, the loop filtering part determines the filter intensity for the target signal component for filtering process that is a luminance signal component as bS=2, and determines the filter intensity for the target signal component for filtering process that is a color difference signal component as bS=2.
(Step 4)
When the conditions shown in steps 1 to 3 are not satisfied, and one of the following conditions is satisfied, the loop filtering part determines the filter intensity for the target signal component for filtering process that is a luminance signal component as bS=1, and determines the filter intensity for the target signal component for filtering process that is a color difference signal component as bS=1.
[Conditions]
  The partition including $p_0$ and the partition including $q_0$ have different reference pictures or different numbers of motion vectors.
  Each of the partition including $p_0$ and the partition including $q_0$ uses a single motion vector, and the horizontal or vertical component of each of the motion vectors has a difference absolute value of 4 or more of ¼ pixel accuracy.
  Each of the partition including $p_0$ and the partition including $q_0$ uses two motion vectors, and, in at least one pair of motion vectors (pair of a motion vector in $p_0$ and a motion vector in $q_0$) each of which refers to the same reference picture, the horizontal or vertical component of each of the motion vectors has a difference absolute value of 4 or more of ¼ pixel accuracy.
(Step 5)
When the conditions shown in steps 1 to 4 are not satisfied (also an edge other than those each located at a boundary between partitions or transformation blocks does not satisfy these conditions), the loop filtering part determines the filter intensity for the target signal component for filtering process that is a luminance signal component as bS=0, and determines the filter intensity for the target signal component for filtering process that is a color difference signal component as bS=0.

Figure 16:
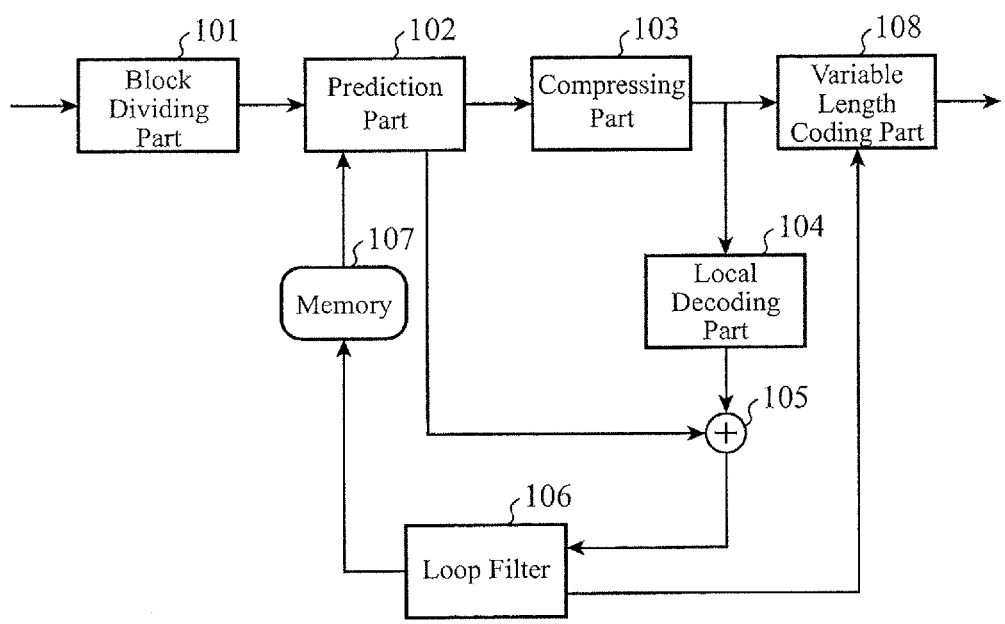
FIG. 16 is a block diagram showing an image coding device disclosed in nonpatent reference 1.

When the coding mode of the coding block which is the target for processing is an intra coding mode, there is a high probability that both the luminance signal and the color difference signals have large prediction residual electric power, and the distribution of the quantized transform coefficients differs greatly for each of the signal components as compared with the time that an inter frame prediction using an inter prediction is carried out. Because the degree of block distortion is influenced by how many effective transform coefficients are subjectively lost due to the quantization, it is desirable to be able to adjust the value of the filter intensity which is a measure for measuring the degree of block distortion for each of the luminance and color difference components particularly in the intra coding. While the filter intensity for each of the color difference signal components is always set to be the same value as that for the luminance signal component in the conventional loop filter 106 (refer to FIG. 16), a filter intensity is set for each of the signal components (the luminance signal component and the color difference signal components) according to the conditions in this Embodiment 1, and therefore a filter intensity which contributes to an improvement in the image quality as compared with the conventional loop filter is acquired for each of the signal components.

Figure 11:
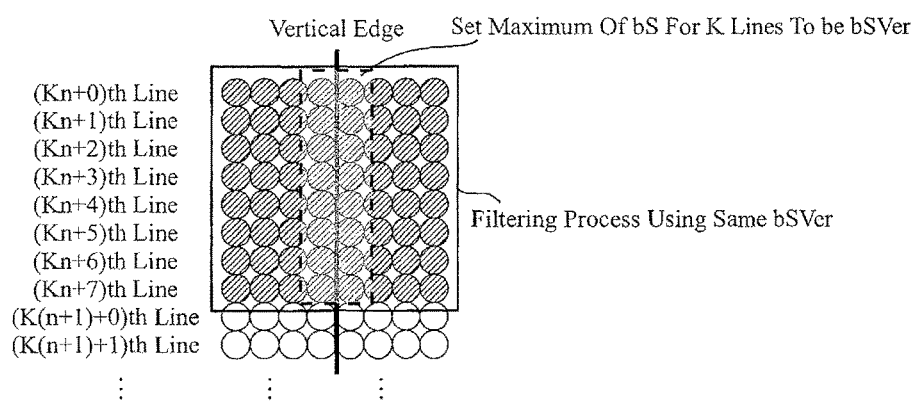
FIG. 11 is an explanatory drawing showing a unit in which a filtering process is carried out on a vertical edge.
Figure 12:
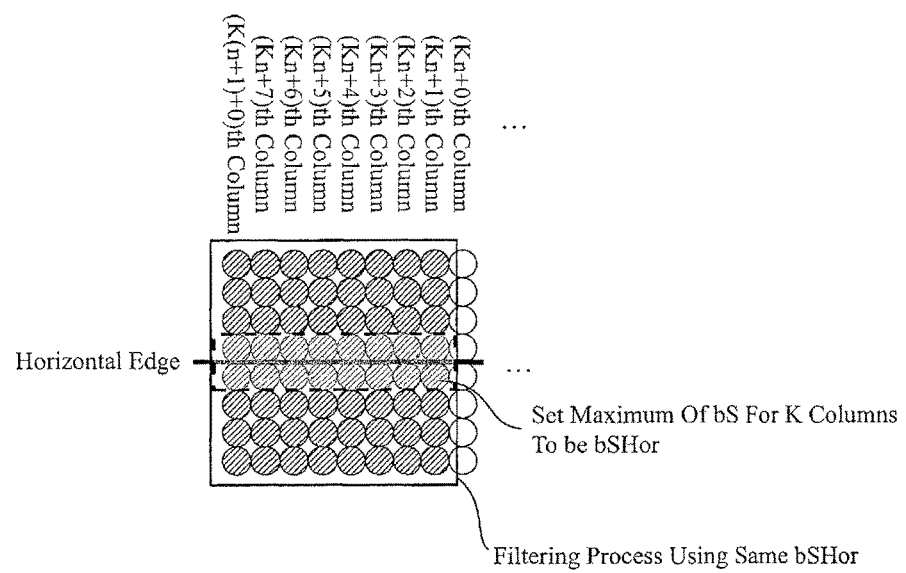
FIG. 12 is an explanatory drawing showing a unit in which a filtering process is carried out on a horizontal edge.

After carrying out the determination of the filter intensity, the loop filtering part 11 carries out the filtering process in the order of vertical edges and horizontal edges on the basis of the result of the determination of the filter intensity. First, the loop filtering part 11 calculates a maximum of the filter intensity bS for every K lines partially including a vertical edge, and sets the maximum as bSVer. The loop filtering part 11 carries out the filtering process on pixels adjacent to the edge in the K lines on the basis of the maximum bSVer. FIG. 11 is an explanatory drawing showing a unit in units of which the filtering process is carried out on a vertical edge. The K×K pixels partially including the vertical edge therein have the same bSVer. The final filter intensity bS applied to each of the pixels is determined by both the maximum bSVer and the amount of change in the pixel value at each pixel position. FIG. 12 is an explanatory drawing showing a unit in units of which the filtering process is carried out on a horizontal edge. The filtering process is the same as that on a vertical edge with the exception that the direction of the process is a horizontal one.

Hereafter, the filtering process on the target pixel for processing will be explained. The loop filtering part 11 carries out the filtering process in a direction of an vertical edge of the luminance signal component according to the following procedure. Although the loop filtering part 11 also carries out the filtering process in a direction of a horizontal edge of the luminance signal component according to the same procedure, the loop filtering part uses the maximum bSHor of the filter intensity bS for every K lines partially including the horizontal edge instead of the maximum bSVer.

[a] in the Case of bSVer=0

The loop filtering part does not carry out the filtering process.

[b] in the Case of bSVer<2

(1) The loop filtering part determines parameters $\beta$ and Tc in the case of Q=(the qP value of the luminance) in FIG. 13. FIG. 13 is an explanatory drawing showing a correspondence between Q (the qP value of the luminance), and the parameters $\beta$ and Tc.

(2) Determine $d=|p_2-2*p_1+p_0|+|q_2-2*q_1+q_0|+|p_2-2*p_1+p_0|+|q_2-2*q_1+q_0|$, and perform a filter calculation according to the following conditions. When d is smaller than $\beta>>2$, $|p_3-p_0|+|q_0-q_3|$ is smaller than $\beta>>2$, and $|p_0-q_0|$ is smaller than $((5*t_c+1)>>1)$, $p_0'=\text{Clip1}_Y((p_2+2*p_1+2*p_0+2*q_0+q_1+4)>>3)$ $p_1'=\text{Clip1}_Y((p_2+p_1+p_0+q_0+2)>>2)$ $p_2'=\text{Clip1}_Y((2*p_3+3*p_2+p_1+p_0+q_0+4)>>3)$ $q_0'=\text{Clip1}_Y((p_1+2*p_0+2*q_0+2*q_1+q_2+4)>>3)$ $q_1'=\text{Clip1}_Y((p_0+q_0+q_1+q_2+2)>>2)$ $q_2'=\text{Clip1}_Y((p_0+q_0+q_1+3*q_2+2*q_3+4)>>3)$ Otherwise, $\Delta=\text{Clip3}(-t_C,t_C,(13*(q_0-p_0)+4*(q_1-p_1)-5*(q_2-p_0)+16)>>5)$ $p_0'=\text{Clip1}_Y(p_0+\Delta)$ $q_0'=\text{Clip1}_Y(q_0-\Delta)$ $p_1'=\text{Clip1}_Y(p_1+\Delta/2)$ $q_1'=\text{Clip1}_Y(q_1-\Delta/2)$ (3) Convert $p_0'$ to $p_2'$ and $q_0'$ to $q_2'$, which are determined as above, to values of pixels $p_0$ to $p_2$ and $q_0$ to $q_2$, and output converted image as decoded image to motion-compensated prediction frame memory 12 at next stage.

[c] in the Case of bSVer2

The loop filtering part determines the parameter $\beta$ in the case of Q=(the qP value of the luminance) and the parameter Tc in the case of Q=(the qP value of the luminance+4) in FIG. 13. The loop filtering part carries out the subsequent processes in the same way that the loop filtering part does in the case of bSVer≤2.

The loop filtering part 11 carries out the filtering process in a direction of a vertical edge of each of the color difference signal components according to the following procedure. Although the loop filtering part 11 also carries out the filtering process in a direction of a horizontal edge of each of the color difference signal components according to the same procedure, the loop filtering part uses the maximum bSHor instead of the maximum bSVer. bSVer and bSVer are the values calculated for the luminance at the same position.

[a] in the Case of bSVer>2

(1) Perform the following filter calculation.

$\Delta=\text{Clip3}(-t_C,t_C,((((q_0-p_0)<<2)+p_1-q_1+4)>>3))$ $p_0'=\text{Clip1}_C(p_0+\Delta)$ $q_0'=\text{Clip1}_C(q_0-\Delta)$ (2) Convert $p_0'$ and $q_0'$, which are determined as above, to values of pixels $p_0$ and $q_0$, and output converted image as decoded image to motion-compensated prediction frame memory 12 at next stage.

[b] in the Case of bSVer≤2

The loop filtering part does not carry out the filtering process.

While the loop filtering part 11 of the image coding device and the loop filtering part 28 of the image decoding device carry out a common process, the loop filtering part 11 of the image coding device can be constructed in such a way as to have a parameter for control for the determination of the filter intensity. For example, the image coding device can be constructed in such a way as to multiplex identification information showing whether or not to carry out signaling of the value of the filter intensity bS on the slice level, thereby making it possible to change the setting of the filter intensity bS on a per slice basis. At this time, the image coding device enables only the setting of the filter intensity for the luminance signal component to be changed while fixing the setting of the filter intensity for each of the color difference signal components. In contrast with this, the image coding device enables only the setting of the filter intensity for each of the color difference signal components to be changed while fixing the setting of the filter intensity for the luminance signal component. The image coding device can carry out the signaling of the setting of the filter intensity by simply transmitting the setting itself. The image coding device can alternatively carry out the signaling of the setting of the filter intensity by transmitting an offset from the default value of the filter intensity bS. The filter intensity for each of the color difference signal components can be expressed as an offset from the filter intensity for the luminance signal component.

Further, the image coding device can also be constructed in such a way as to carry out signaling of the setting of the filter intensity bS by simply transmitting the setting itself or an offset from the default value particularly in the case in which the coding mode is an intra coding mode. For example, the loop filtering part 11 can be constructed in such a way as to determine the filter intensity according to the following procedure.

When the intensity value of the filter used for the luminance component of a coding block coded in an intra coding mode is expressed as bSL and the intensity value of the filter used for each color difference component of the coding block is expressed as bSC, both bSL and bSC are multiplexed into the bitstream as syntax information, such as a header on the picture level or a slice header, so that bSL and bSC can be shared between the coding device and the decoding device.
(Step 1)

At this time, when an edge is located at a boundary between coding blocks, and the coding mode of the coding block including $p_0$ or the coding block including $q_0$ is an "intra coding mode," the loop filtering part determines the filter intensity for the target signal component for filtering process that is a luminance signal component as bS=max (4-bSL, 0), and determines the filter intensity for the target signal component for filtering process that is a color difference signal component as bS=max(4-bSC, 0). max(A, B) is a function of outputting the larger one of A and B.
(Step 2)

When the condition shown in step 1 is not satisfied, and the coding mode of the coding block including $p_0$ or the coding block including $q_0$ is an "intra coding mode," the loop filtering part determines the filter intensity for the target signal component for filtering process that is a luminance signal component as bS=max(3-bSL, 0), and determines the filter intensity for the target signal component for filtering process that is a color difference signal component as bS=max(3-bSC, 0).

When the coding mode is an intra coding mode, there are a case in which the intra coding is carried out unavoidably without a motion prediction functioning effectively in the compression process, and a case in which the intra coding is carried out periodically and intentionally from the viewpoint of error resistance and random access. In the case in which the intra coding is carried out unavoidably, an additional distortion is superimposed according to the difficulty of the coding. In contrast with this, in the case in which the intra coding is carried out periodically and intentionally, a difference appears in the occurrence of a block distortion because the intra coding is directly used regardless of the difficulty of the coding. A conventional loop filter has no means of discriminating between these cases to control the filter intensity. Because periodic intra-frame insertion is carried out on a per slice basis or on a per picture basis, controlling the filter intensity on a per slice basis or on a per picture basis according to the use to which the image coding device is put makes it possible to prevent the occurrence of a block distortion more effectively. As an alternative, the image coding device can be constructed in such a way as to carry out signaling of the setting of the filter intensity bS at the time that the coding mode is an inter coding mode.

Figure 14:
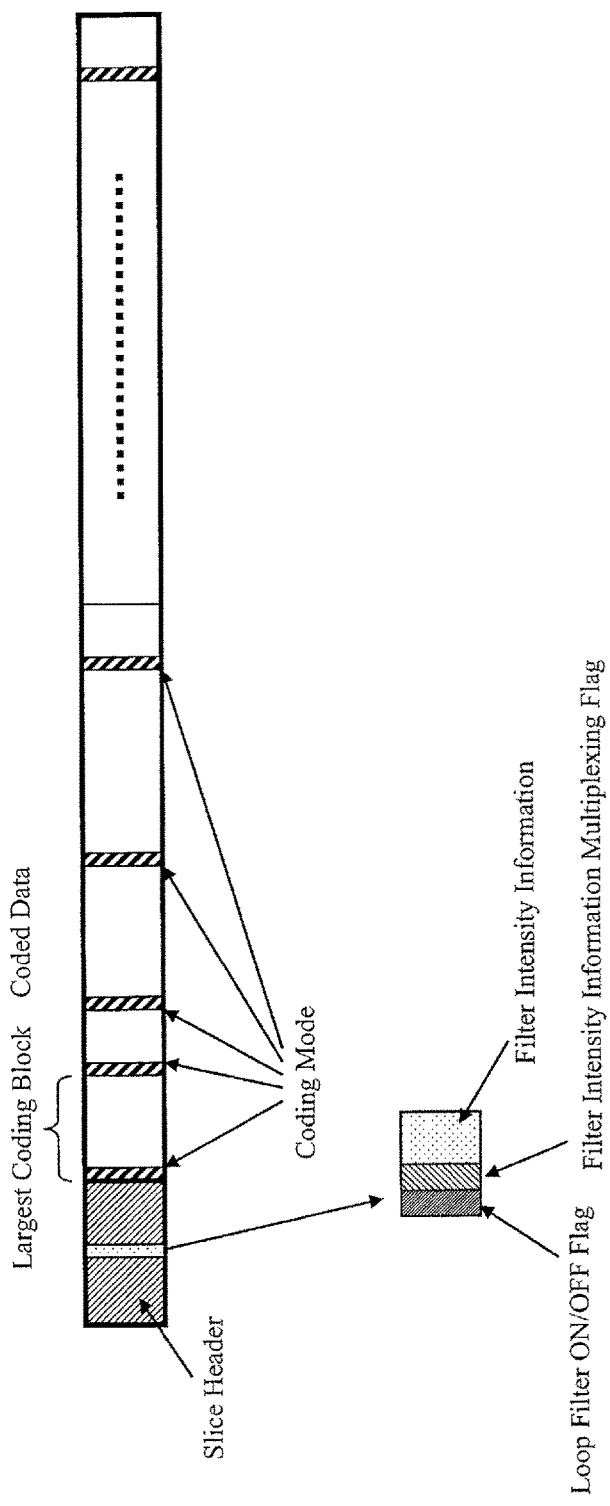
FIG. 14 is an explanatory drawing showing a bitstream generated by a variable length coding part 13.

FIG. 14 is an explanatory drawing showing the bitstream generated by the variable length coding part 13. In the example shown in FIG. 14, a state in which slice coded data consist of a slice header and a number of the coded data of largest coding blocks, which follow the slice header, in the slice is shown. The coded data of each largest coding block includes coding mode information. Although not illustrated, the coded data of each largest coding block includes prediction parameters, such as the motion vector of each partition, prediction difference coding parameters, such as a transformation block size, and prediction difference coded data (quantized transform coefficients). The slice header includes a loop filter ON/OFF flag that is identification information showing whether or not to carry out the loop filtering process on each of all the coding blocks in the slice, a filter intensity information multiplexing flag indicating whether or not to carry out signaling of the setting of the filter intensity bS, and filter intensity information that is multiplexed into the bitstream when the filter intensity information multiplexing flag is "1." The filter intensity information multiplexing flag and the filter intensity information can be configured in such a way as to be multiplexed into an header information region that is defined on a per picture, sequence, or GOP (Group Of Pictures) basis.

Next, the processing carried out by the image decoding device shown in FIG. 3 will be explained. When receiving the bitstream outputted from the image coding device shown in FIG. 1, the variable length decoding part 21 carries out a variable length decoding process on the bitstream (step ST21 of FIG. 4), and decodes the information for defining the picture size (the number of horizontal pixels and the number of vertical lines) on a per sequence basis, each sequence consisting of one or more frames of pictures, or on a per picture basis.

The variable length decoding part 21 determines a maximum size of each of coding blocks which is a unit to be processed at a time when a motion-compensated prediction process (inter-frame prediction process) or an intra prediction process (intra-frame prediction process) is carried out according to the same procedure as that which the coding controlling part 1 shown in FIG. 1 uses, and also determines an upper limit on the number of hierarchical layers in a hierarchy in which each of the coding blocks having the maximum size is hierarchically divided into blocks (step ST22). For example, when the maximum size of each of coding blocks is determined according to the resolution of the inputted image in the image coding device, the variable length decoding part determines the maximum size of each of the coding blocks on the basis of the frame size which the variable length decoding part has decoded previously. When information showing both the maximum size of each of the coding blocks and the upper limit on the number of hierarchical layers is multiplexed into the bitstream, the variable length decoding part refers to the information which is acquired by decoding the bitstream. When the bitstream has a structure shown in FIG. 14, the variable length decoding part 21 decodes the loop filter ON/OFF flag from the slice header in advance of decoding each largest coding block.

Because the information showing the state of the division of each of the coding blocks $B^0$ having the maximum size is included in the coding mode $m(B^0)$ of each coding block $B^0$ having the maximum size which is multiplexed into the bitstream, the variable length decoding part 21 specifies each of the coding blocks $B^n$ into which the image is divided hierarchically by decoding the bitstream to acquire the coding mode $m(B^0)$ of the coding block $B^0$ having the maximum size which is multiplexed into the bitstream (step ST23). After specifying each of the coding blocks $B^n$, the variable length decoding part 21 decodes the bitstream to acquire the coding mode $m(B^n)$ of the coding block $B^n$ to specify each partition $P_i^n$ belonging to the coding block $B^n$ on the basis of the information about the partition $P_i^n$ belonging to the coding mode $m(B^n)$. After specifying each partition $P_i^n$ belonging to the coding block $B^n$, the variable length decoding part 21 decodes the coded data to acquire the compressed data, the coding mode, the prediction difference coding parameters, and the intra prediction parameter or the inter prediction parameters (including the motion vector) for each partition $P_i^n$ (step ST24).

When the coding mode m(B) of the partition $P_i^n$ belonging to the coding block $B^n$, which is outputted from the variable length decoding part 21, is an intra coding mode (step ST25), the selection switch 22 outputs the intra prediction parameter outputted thereto from the variable length decoding part 21 to the intra prediction part 23. In contrast, when the coding mode $m(B^n)$ of the partition $P_i^n$ is an inter coding mode (step ST25), the selection switch outputs the inter prediction parameters outputted thereto from the variable length decoding part 21 to the motion-compensated prediction part 24.

When receiving the intra prediction parameter from the selection switch 22, the intra prediction part 23 carries out an intra prediction process on the partition $P_i^n$ of the coding block $B^n$ by using the intra prediction parameter to generate an intra prediction image $P_i^n$ while referring to the decoded image (reference image) of an already-decoded block stored in the memory 27 for intra prediction (step ST26).

When receiving the inter prediction parameters outputted from the selection switch 22, the motion compensation part 24 carries out an inter prediction process on the coding block by using the motion vector included in the inter prediction parameters and the decoded image (reference image) of an already-decoded block stored in the motion-compensated prediction frame memory 29 to generate an intra prediction image $P_i^n$ (step ST27).

The inverse quantization/inverse transformation part 25 inverse-quantizes the compressed data outputted thereto from the variable length decoding part 21 by using the quantization parameter included in the prediction difference coding parameters outputted thereto from the variable length decoding part 21, and performs an inverse transformation process (e.g., an inverse DCT (inverse discrete cosine transform) or an inverse transformation process such as an inverse KL transform) on the compressed data inverse-quantized thereby in units of a block having the transformation block size included in the prediction difference coding parameters, and outputs the compressed data on which the inverse quantization/inverse transformation part has carried out the inverse transformation process to the adding part 26 as a decoded prediction difference signal (signal showing a pre-compressed difference image) (step ST28).

When receiving the decoded prediction difference signal from the inverse quantization/inverse transformation part 25, the adding part 26 generates a decoded image by adding the decoded prediction difference signal and the prediction signal showing the prediction image generated by the intra prediction part 23 or the motion-compensated prediction part 24 and stores the decoded image signal showing the decoded image in the memory 27 for intra prediction, and also outputs the decoded image signal to the loop filtering part 28 (step ST29).

The image decoding device repeatedly carries out the processes of steps ST23 to ST29 until the image decoding device completes the processing on all the coding blocks $B^n$ into which the image is divided hierarchically (step ST30). When receiving the decoded image signal from the adding part 26, the loop filtering part 28 carries out a filtering process on the decoded image signal to remove a distortion (block distortion) occurring at a block boundary, and stores the decoded image shown by the decoded image signal from which the distortion is removed in the motion-compensated prediction frame memory 29. The filtering process carried out by the loop filtering part 28 is the same as that carried out by the loop filtering part 11 shown in FIG. 1, and, when removing a block distortion occurring in the decoded image, the loop filtering part 28 sets the intensity of a filter for removing a block distortion for each of the signal components (the luminance signal component and the color difference signal components) according to the coding mode information (an intra coding mode or an inter coding mode) outputted from the variable length decoding part 21. When the variable length decoding part 21 decodes the filter intensity information multiplexing flag and the filter intensity information from the slice header, the loop filtering part carries out the filtering process with the filter intensity bS shown by the filter intensity information.

As can be seen from the above description, the loop filtering part 28 of the image decoding device in accordance with this Embodiment 1 is constructed in such a way as to, when removing a block distortion occurring in the decoded image, set the intensity of a filter for removing the block distortion for each of the signal components (the luminance signal component and the color difference signal components) according to the coding mode information (an intra coding mode or an inter coding mode) outputted from the variable length decoding part 21. Therefore, there is provided an advantage of being able to improve the accuracy of removal of a block distortion, thereby improving the quality of the decoded image.

Although the example in which the image coding device carries out an inter-frame motion-compensated prediction process (inter prediction process) and the image decoding device carries out an inter-frame motion-compensated prediction process (inter prediction process) is shown in the above explanation, each of the loop filtering parts 11 and 28 can be constructed in such a way as to remove a block distortion even when the image coding device carries out an intra-frame prediction process (intra prediction process) on each of all the frames and the image decoding device carries out an intra-frame prediction process (intra prediction process) on each of all the frames. In a case in which the image coding device is constructed in such a way as to carry out a combination of an intra-frame prediction process (intra prediction process) and an inter-frame motion-compensated prediction process (inter prediction process), and the image decoding device is constructed in such a way as to carry out a combination of an intra-frame prediction process (intra prediction process) and an inter-frame motion-compensated prediction process (inter prediction process), it is possible to control the loop filtering parts 11 and 28 in such a way that these loop filtering parts do not operate when all the frames are set to be coded through an intra prediction process.

Figure 15:
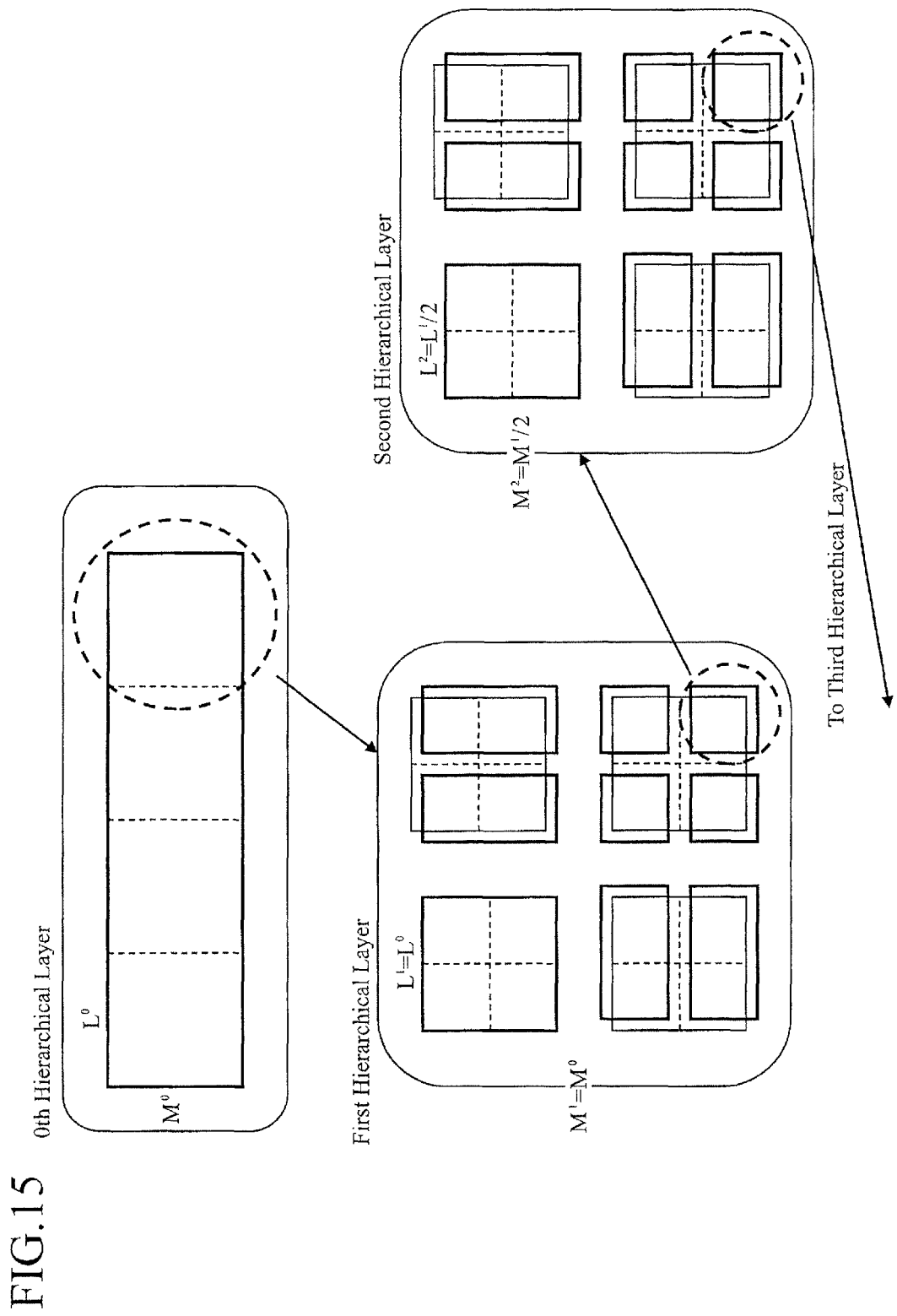
FIG. 15 is an explanatory drawing showing an example in which the size of a coding to block B″ is L″=kM″.

Although the example in which the size of the coding block B″ is L″=M″ as shown in FIG. 5 is shown in this Embodiment 1, the size of the coding block B″ can be L″≠M″. For example, there can be considered a case in which the size of the coding block B″ is L″=kM″ as shown in FIG. 15. In this case, $(L^{n+1}, M^{n+1})$ becomes equal to (L″, M″) in the next division, and subsequent divisions can be carried out in the same way as those shown in FIG. 5 or in such a way that $(L^{n+1}, M^{n+1})$ becomes equal to (L″/2, M″/2).

For example, by setting M°=16 using this configuration, a largest coding block that is formed of horizontally-coupled macroblocks each of which consists of 16×16 pixels, like those defined in MPEG-2 (ISO/IEC 13818-2) or MPEG-4 AVC/H.264 (ISO/IEC 14496-10), can be defined, and there is provided an advantage of being able to construct an image coding device that maintains compatibility with such an existing method. It is needless to say that division can be carried out on even a largest coding block that is formed of vertically-coupled macroblocks, such as macroblocks in the case of not L″=kM″ but kL″=M″, under the same idea.

While the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

Because each of the image coding device and the image decoding device in accordance with the present invention has a function of setting the intensity of a filter for each signal component according to the coding mode, thereby being able to improve the accuracy of removal of a block distortion and hence improve the quality of the coded image, and each of the image coding method and the image decoding method in accordance with the present invention has a step of setting the intensity of a filter for each signal component according to the coding mode, thereby being able to improve the accuracy of removal of a block distortion and hence improve the quality of the coded image, the image coding device, the image decoding device, the image coding method, and the image decoding method can be applied to an international standard video coding method, such as MPEG or ITU-T H.26x.

EXPLANATIONS OF REFERENCE NUMERALS

1 coding controlling part (coding mode determining unit), 2 block dividing part (block division unit), 3 select switch (prediction image generating unit), 4 intra prediction part (prediction image generating unit), 5 motion-compensated prediction part (prediction image generating unit), 6 subtracting part (difference image generating unit), 7 transformation/quantization part (image compression unit), 8 inverse quantization/inverse transformation part (local decoded image), 9 adding part (local decoded image), 10 memory for intra prediction, 11 loop filtering part (distortion removing unit), 12 motion-compensated prediction frame memory, 13 variable length coding part (coding unit), 21 variable length decoding part (decoding unit), 22 select switch (prediction image generating unit), 23 intra prediction part (prediction image generating unit), 24 motion compensation part (prediction image generating unit), 25 inverse quantization/inverse transformation part (difference image generating unit), 26 adding part (decoded image generating unit), 27 memory for intra prediction, 28 loop filtering part (distortion removing unit), 12 motion-compensated prediction frame memory, 101 block dividing part, 102 predicting part, 103 compressing part, 104 local decoding part, 105 adder, 106 loop filter, 107 memory, 108 variable length coding part.

The invention claimed is:

1. An image encoding device that carries out a block based coding process on each of coding blocks of an inputted image, each of the coding blocks being a unit for coding process, the image encoding device comprising:
   a distortion remover to carry out a filtering process on a decoded image obtained by adding a prediction image to a difference image which is a difference between the inputted image of a coding block and the prediction image, and to remove a block distortion at a boundary between adjacent transform blocks of the decoded image, the transform block being for transforming the difference image; and
   a data encoder to encode a compressed data of the difference image and an offset,
   wherein the distortion remover derives a value of a parameter specifying filtering strength as a default value for the offset according to a set of conditions including a state of a motion parameter in a partition including a pixel to which the filtering process is to be applied, wherein the offset is added to the value of the parameter in a process of selecting from different filtering processes.

2. An image encoding method that carries out a block based coding process on each of coding blocks of an inputted image, each of the coding blocks being a unit for coding process, the image encoding method comprising:
   carrying out a filtering process on a decoded image obtained by adding a prediction image to a difference image which is a difference between the inputted image of a coding block and the prediction image, and removing a block distortion at a boundary between adjacent transform blocks of the decoded image, the transform block being for transforming the difference image; and
   encoding a compressed data of the difference image and an offset,
   wherein the filtering process derives a value of a parameter specifying filtering strength as a default value for the offset according to a set of conditions including a state of a motion parameter in a partition including a pixel to which the filtering process is to be applied, wherein the offset is added to the value of the parameter in a process of selecting from different filtering processes.

3. An image decoding device that carries out a decoding process on a coded data obtained by performing a block based coding process on an image, the image decoding device comprising:
   a coded data decoder to decode the coded data to acquire compressed data of a difference image associated with each of coding blocks and an offset; and a distortion remover to carry out a filtering process on a decoded image obtained by adding a prediction image to the difference image, and to remove a block distortion at a boundary between adjacent transform blocks of the decoded image, the transform block being for transforming the difference image, wherein the distortion remover derives a value of a parameter specifying filtering strength as a default value for the offset according to a set of conditions including a state of a motion parameter in a partition including a pixel to which the filtering process is to be applied, wherein the offset is added to the value of the parameter in a process of selecting from different filtering processes.

4. An image decoding method that carries out a decoding process on a coded data obtained by performing a block based coding process on an image, the image decoding method comprising:

decoding the coded data to acquire compressed data of a difference image associated with each of coding blocks and an offset; and carrying out a filtering process on a decoded image obtained by adding a prediction image to the difference image, and removing a block distortion at a boundary between adjacent transform blocks of the decoded image, the transform block being for transforming the difference image, wherein the filtering process derives a value of a parameter specifying filtering strength as a default value for the offset according to a set of conditions including a state of a motion parameter in a partition including a pixel to which the filtering process is to be applied, wherein the offset is added to the value of the parameter in a process of selecting from different filtering processes.

5. A non-transitory computer readable medium comprising coded data for each of a plurality of coding blocks, the coded data including:

compressed data of a difference image; and an offset, wherein the compressed data of the coded data, when read by a processor, enables the processor to carry out a filtering process on a decoded image obtained by adding a prediction image to the difference image, and to remove a block distortion at a boundary between adjacent transform blocks of the decoded image, the transform block being for transforming the difference image, and wherein the compressed data enables the processor to derive a value of a parameter specifying filtering strength as a default value for the offset according to a set of conditions including a state of a motion parameter in a partition including a pixel to which the filtering process is to be applied, wherein the offset is added to the value of the parameter in a process of selecting from different filtering processes.

* * * * *